US010723821B2

(12) United States Patent
Yang et al.

(10) Patent No.: US 10,723,821 B2
(45) Date of Patent: Jul. 28, 2020

(54) SUPPORTED METALLOCENE CATALYST SYSTEMS FOR POLYMERIZATION

(71) Applicant: ExxonMobil Chemical Patents Inc., Baytown, TX (US)

(72) Inventors: Jian Yang, Houston, TX (US); Lubin Luo, Houston, TX (US); Steven D. Brown, League City, TX (US); Xiongdong Lian, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/570,809

(22) PCT Filed: May 27, 2016

(86) PCT No.: PCT/US2016/034755
§ 371 (c)(1),
(2) Date: Oct. 31, 2017

(87) PCT Pub. No.: WO2016/196331
PCT Pub. Date: Dec. 8, 2016

(65) Prior Publication Data
US 2018/0162964 A1    Jun. 14, 2018

Related U.S. Application Data

(60) Provisional application No. 62/205,977, filed on Aug. 17, 2015, provisional application No. 62/206,004, (Continued)

(51) Int. Cl.
*C07F 17/00* (2006.01)
*C08F 4/6592* (2006.01)
(Continued)

(52) U.S. Cl.
CPC .............. *C08F 10/06* (2013.01); *C07F 17/00* (2013.01); *C08F 110/06* (2013.01);
(Continued)

(58) Field of Classification Search
CPC ..... C07F 17/00; C08F 4/65927; C08F 110/06
See application file for complete search history.

(56) References Cited

U.S. PATENT DOCUMENTS

| 5,049,535 A | 9/1991 | Resconi et al. |
| 5,276,208 A | 1/1994 | Winter et al. |

(Continued)

FOREIGN PATENT DOCUMENTS

| CN | 102731691 | 2/2014 |
| EP | 0834519 | 4/1998 |

(Continued)

OTHER PUBLICATIONS

U.S. Appl. No. 15/570,814, filed Oct. 31, 2017 Luo et al.
(Continued)

*Primary Examiner* — Caixia Lu
(74) *Attorney, Agent, or Firm* — Catherine L. Bell

(57) ABSTRACT

This invention relates to supported metallocene catalyst systems for polymerization, the catalyst systems comprising asymmetrically substituted indenyl groups, high surface area supports, and aluminoxane activators. This invention also relates to methods for polymerizing olefins, including methods for producing isotactic polypropylene.

40 Claims, 4 Drawing Sheets

Related U.S. Application Data filed on Aug. 17, 2015, provisional application No. 62/171,630, filed on Jun. 5, 2015.

(51) Int. Cl.
*C08F 10/06* (2006.01)
*C08F 110/06* (2006.01)
*C08F 4/659* (2006.01)

(52) U.S. Cl.
CPC ...... C08F 4/65912 (2013.01); C08F 2500/12 (2013.01); C08F 2500/15 (2013.01)

(56) References Cited

U.S. PATENT DOCUMENTS

| | | |
|---|---|---|
| 5,278,264 A | 1/1994 | Spaleck et al. |
| 5,411,994 A | 5/1995 | Galli et al. |
| 5,459,117 A | 10/1995 | Ewen |
| 5,532,396 A | 7/1996 | Winter et al. |
| 5,539,076 A | 7/1996 | Nowlin et al. |
| 5,543,373 A | 8/1996 | Winter et al. |
| 5,547,756 A | 8/1996 | Kamo et al. |
| 5,585,509 A | 12/1996 | Langhauser et al. |
| 5,589,549 A | 12/1996 | Govoni et al. |
| 5,631,202 A | 5/1997 | Ewen |
| 5,661,098 A | 8/1997 | Harrison et al. |
| 5,696,045 A | 12/1997 | Winter et al. |
| 5,700,886 A | 12/1997 | Winter et al. |
| 5,770,753 A | 6/1998 | Kueber et al. |
| 5,786,432 A | 7/1998 | Kueber et al. |
| 5,840,644 A | 11/1998 | Kueber et al. |
| 5,990,242 A | 11/1999 | Naga et al. |
| 5,869,584 A | 12/1999 | Winter et al. |
| 6,001,764 A | 12/1999 | Pullukat et al. |
| 6,028,140 A | 2/2000 | Collina et al. |
| 6,051,727 A | 4/2000 | Kueber et al. |
| 6,069,213 A | 5/2000 | Nemzek et al. |
| 6,121,182 A | 9/2000 | Okumura et al. |
| 6,150,481 A | 11/2000 | Winter et al. |
| 6,174,930 B1 | 1/2001 | Agarwal et al. |
| 6,242,544 B1 | 6/2001 | Kueber et al. |
| 6,255,506 B1 | 7/2001 | Kueber et al. |
| 6,262,195 B1 | 7/2001 | Dall'Occo et al. |
| 6,329,315 B1 | 12/2001 | Denton et al. |
| 6,350,830 B1 | 2/2002 | Gores et al. |
| 6,376,627 B1 | 4/2002 | Burkhardt |
| 6,399,533 B2 | 6/2002 | Sacchetti et al. |
| 6,429,250 B1 | 8/2002 | Rohrmann et al. |
| 6,444,833 B1 | 9/2002 | Ewen et al. |
| 6,492,465 B1 | 12/2002 | Burkhardt et al. |
| 6,559,252 B1 | 5/2003 | Horton et al. |
| 6,608,224 B2 | 8/2003 | Guidotti et al. |
| 6,635,779 B1 | 10/2003 | Ewen et al. |
| 6,673,736 B2 | 1/2004 | Kellum et al. |
| 6,777,366 B2 | 8/2004 | Gauthier et al. |
| 6,777,367 B2 | 8/2004 | Gauthier et al. |
| 6,787,616 B2 | 9/2004 | Takemori et al. |
| 6,841,501 B2 | 1/2005 | Resconi et al. |
| 6,846,943 B2 | 1/2005 | Nakano et al. |
| 6,855,783 B2 | 2/2005 | Gauthier et al. |
| 6,870,016 B1 | 3/2005 | Burkhardt et al. |
| 6,878,786 B2 | 4/2005 | Resconi et al. |
| 6,916,886 B2 | 7/2005 | Morioka et al. |
| 6,949,614 B1 | 9/2005 | Schottek et al. |
| 6,953,829 B2 | 10/2005 | Kratzer |
| 6,992,153 B1 | 1/2006 | Collina et al. |
| 7,034,173 B2 | 4/2006 | Schottek |
| 7,122,498 B2 | 10/2006 | Hart et al. |
| 7,141,527 B1 | 11/2006 | Van Baar et al. |
| 7,314,903 B2 | 1/2008 | Resconi et al. |
| 7,342,078 B2 | 3/2008 | Schottek et al. |
| 7,405,261 B2 | 7/2008 | Schulte et al. |
| 7,452,949 B2 | 11/2008 | Okumura et al. |
| 7,569,651 B2 | 8/2009 | Schottek et al. |
| 7,615,597 B2 | 11/2009 | Resconi et al. |
| 7,799,880 B2 | 9/2010 | Ciaccia |
| 7,829,495 B2 | 11/2010 | Floyd et al. |
| 7,964,679 B2 | 6/2011 | Resconi et al. |
| 7,985,799 B2 | 7/2011 | Resconi et al. |
| 8,222,356 B2 | 7/2012 | Kipke et al. |
| 8,299,287 B2 | 10/2012 | Dimeska et al. |
| 8,318,872 B2 | 11/2012 | Savatsky et al. |
| 8,399,375 B2 | 3/2013 | Itan et al. |
| 8,415,492 B2 | 4/2013 | Sell et al. |
| 8,507,706 B2 | 8/2013 | Dimeska et al. |
| 8,557,917 B2 | 10/2013 | Leskinen et al. |
| 8,729,206 B2 | 5/2014 | Resconi et al. |
| 9,193,856 B2 | 11/2015 | Ebata et al. |
| 9,249,239 B2 | 2/2016 | Jian et al. |
| 9,376,559 B2 | 6/2016 | Holtcamp et al. |
| 9,458,257 B2 | 10/2016 | Funaya et al. |
| 9,464,145 B2 | 10/2016 | Yang et al. |
| 9,644,047 B2 | 5/2017 | Yang et al. |
| 9,718,900 B2 | 8/2017 | Giesbrecht |
| 9,725,537 B2 | 8/2017 | Luo et al. |
| 9,725,569 B2 | 8/2017 | Holtcamp et al. |
| 9,738,779 B2 | 8/2017 | Luo et al. |
| 9,745,390 B2 | 8/2017 | Yang et al. |
| 9,809,664 B2 | 11/2017 | Luo et al. |
| 9,834,628 B2 | 12/2017 | Canich et al. |
| 9,920,176 B2 | 3/2018 | Luo et al. |
| 9,944,665 B2 | 4/2018 | Yang et al. |
| 10,077,325 B2 | 9/2018 | Luo et al. |
| 10,119,016 B2 | 11/2018 | Luo et al. |
| 2001/0053833 A1 | 12/2001 | Nakano et al. |
| 2002/0147105 A1 | 2/2002 | Shamshoum et al. |
| 2003/0171207 A1 | 9/2003 | Shih et al. |
| 2003/0236365 A1 | 12/2003 | Tian et al. |
| 2004/0204310 A1 | 10/2004 | Gauthier et al. |
| 2005/0003951 A1 | 1/2005 | Ferraro et al. |
| 2005/0085376 A1 | 4/2005 | Nagy et al. |
| 2005/0182266 A1 | 8/2005 | Schulte et al. |
| 2007/0004814 A1 | 1/2007 | Resconi et al. |
| 2007/0055021 A1 | 3/2007 | Chandrashekar et al. |
| 2007/0179051 A1 | 8/2007 | Mihan et al. |
| 2009/0018267 A1 | 1/2009 | Vestberg et al. |
| 2009/0062492 A1 | 3/2009 | Luo et al. |
| 2009/0259007 A1 | 10/2009 | Ciaccia |
| 2010/0267907 A1 | 10/2010 | Dimeska et al. |
| 2011/0034649 A1 | 2/2011 | Standaert et al. |
| 2011/0160373 A1 | 2/2011 | Bernreitner et al. |
| 2011/0081817 A1 | 4/2011 | Bieser et al. |
| 2011/0112262 A1 | 5/2011 | Gauthier et al. |
| 2011/0230630 A1 | 9/2011 | Sell et al. |
| 2013/0253124 A1 | 9/2013 | Bernreiter et al. |
| 2013/0345376 A1 | 12/2013 | Luo et al. |
| 2014/0221514 A1 | 8/2014 | Datta et al. |
| 2014/0303308 A1 | 10/2014 | Grestenberger et al. |
| 2014/0357771 A1 | 12/2014 | Tranninger et al. |
| 2015/0025205 A1 | 1/2015 | Yang et al. |
| 2015/0025208 A1 | 1/2015 | Yang et al. |
| 2015/0119537 A1 | 4/2015 | Holtcamp et al. |
| 2015/0183893 A1 | 7/2015 | Yang et al. |
| 2016/0032025 A1 | 2/2016 | Giesbrecht |
| 2016/0137763 A1 | 5/2016 | Holtcamp et al. |
| 2016/0244539 A1 | 8/2016 | Resconi et al. |
| 2016/0335619 A1 | 12/2016 | Ye et al. |
| 2016/0355618 A1 | 12/2016 | Luo et al. |
| 2016/0355653 A1 | 12/2016 | Holtcamp et al. |
| 2016/0355654 A1 | 12/2016 | Luo et al. |
| 2016/0355655 A1 | 12/2016 | Luo et al. |
| 2016/0355656 A1 | 12/2016 | Luo et al. |
| 2016/0355657 A1 | 12/2016 | Luo et al. |
| 2017/0342175 A1 | 11/2017 | Hagadorn et al. |
| 2018/0022843 A1 | 1/2018 | Luo et al. |
| 2018/0142045 A1 | 5/2018 | Luo |
| 2018/0142046 A1 | 5/2018 | Luo |
| 2018/0179309 A1 | 6/2018 | Luo et al. |

FOREIGN PATENT DOCUMENTS

| | | |
|---|---|---|
| EP | 1205493 | 5/2002 |
| EP | 1380598 | 1/2004 |
| EP | 1541598 | 6/2005 |

(56) References Cited

FOREIGN PATENT DOCUMENTS

| JP | 2003-073414 | 3/2003 |
|---|---|---|
| JP | 2012-214709 | 11/2012 |
| WO | 01/58970 | 8/2001 |
| WO | 02/02575 | 1/2002 |
| WO | 02/02576 | 1/2002 |
| WO | 03/002583 | 1/2003 |
| WO | 03/045551 | 6/2003 |
| WO | 03/051934 | 6/2003 |
| WO | 2004/052945 | 6/2004 |
| WO | 2004/092225 | 10/2004 |
| WO | 2004/106351 | 12/2004 |
| WO | 2014/016318 | 1/2014 |
| WO | 2015/065676 | 5/2015 |
| WO | 2015/070360 | 5/2015 |
| WO | 2016/196331 | 12/2016 |
| WO | 2016/196334 | 12/2016 |
| WO | 2016/196339 | 12/2016 |
| WO | 2016/197014 | 12/2016 |
| WO | 2016/197037 | 12/2016 |
| WO | 2017/204830 | 11/2017 |

OTHER PUBLICATIONS

Resconi et al., "Metallocene Catalysts for Propylene Polymerization," Polypropylene Handbook, Pasquini, Ed., Chapter 2.2, Hanser Publications, Munic, 2005.
U.S. Appl. No. 16/301,596, filed Nov. 14, 2018.
Schmidt et al., "Synthesis and characterization of unbridged metallocene dichloride complexes with two differently mono-substituted indenyl ligands and their application as catalysts for the polymerization of ethane and propene," Journal of Molecular Catalysis A: Chemical, 2001, 172(1-2), pp. 43-65.
Tynys et al., "Ethylene-Propylene Copolyrnerizations: Effect of Metallocene Structure on Termination Reactions and Polymer Miscrostructure," Macromolecular Chemical Phys., 2005, vol. 206, pp. 1043-1056.
Severn et al., Editors, Tailor-Made Polymers, 2008, p. 103.
Imhoff et al., "Characterization of Methylaluminoxanes and Determination of Trimethylaluminum Using Proton NMR", Organometallics, 1998, vol. 17, pp. 1941-1945.
Kaminsky, "Highly Active Metallocene Catalysts for Olefin Polymerization," Journal of Chemical Society, Dalton Trans., 1998, pp. 1413-1418.
Sinn, "Proposals for Structure and Effect of Methylalumoxane Based on Mass Balances and Phase Separation Experiments," Macromolecular Symposia, 1995, vol. 97, Issue 1, pp. 27-52.
Mortazavi et al., "Characterization of MAO-Modified Silicas for Ethylene Polymerization," Journal of Applied Polymer Science, 2013, vol. 130, No. 6, pp. 4568-4575.
Chen et al., "Preparation and characterization of agglomerated porous hollow silica supports for olefin polymerization catalyst," Journal of Non-Crystalline Solids, 2007, vol. 353, No. 11-12, pp. 1030-1036.
Pasquini, N. (Ed.), Polypropylene Handbook, 2005, 2nd Ed., Hanser Publishers, Munich, pp. 78-89.
Shinamoto et al., "Microspherical Silica Supports with High Pore Volume for Metallocene Catalysts," presented at Metallocenes Europe '97 Dusseldorf, Germany, Apr. 8-9, 1997.
Smit et al., "Effects of Methylaluminoxane Immobilization on Silica on the Performance of Zirconocene Catalysts in Propylene Polymerization," Journal of Polymer Science: Part A: Polymer Chemistry, 2005, vol. 43, pp. 2734-2748.
Von Hohenesche et al., "Agglomerated non-porous silica nanoparticles as model carriers in polyethylene synthesis," Journal of Molecular Catalysis A: Chemical, Elsevier, Amsterdam, NL, 2004, vol. 221, No. 1-2, pp. 185-199.
Cecchin et al, "On the Mechanism of Polypropene Growth over MgCl2/TiCl4 Catalyst Systems," Macromolecular Chemistry and Physics, 2001, vol. 202, No. 10, p. 1987-1994.
D'Agnillo et al., "Controlling Molecular Weight Distributions of Polyethylene by Combining Soluble Metallocene/MAO Catalysts," Journal of Polymer Science Part A: Polymer Chemistry, 1998, vol. 36, No. 5, pp. 831-840.
Zheng et al., "Fragmentation Behavior of Silica-Supported Metallocene/MAO Catalysts in the Early Stages of Olefin Polymerization," Macromolecules, 2005, vol. 35, No. 11, pp. 4673-4678.

SUPPORTED METALLOCENE CATALYST SYSTEMS FOR POLYMERIZATION

STATEMENT OF RELATED APPLICATIONS

This application is the National Stage application for PCT/US2016/034755, filed May 27, 2016 and claims priority to and the benefit of U.S. Ser. No. 62/205,977, filed Aug. 17, 2015; U.S. Ser. No. 62/206,004, filed Aug. 17, 2015; and U.S. Ser. No. 62/171,630, filed Jun. 5, 2015; which are incorporated by reference in their entirety.

CROSS REFERENCE TO RELATED APPLICATIONS

This invention also relates to: concurrently filed PCT Application PCT/US2016/034784, filed May 27, 2016; PCT Application PCT/US2016/034760, filed May 27, 2016; and PCT Application PCT/US2016/034768, filed May 27, 2016.

FIELD OF THE INVENTION

This invention relates to supported metallocene catalyst systems for polymerization, the catalyst systems comprising asymmetrically substituted indenyl groups, high surface area supports, and aluminoxane activators. This invention also relates to methods for polymerizing olefins, including methods for producing isotactic polypropylene.

BACKGROUND OF THE INVENTION

Recently, efforts have been made to prepare heterophasic copolymers, such as an impact copolymer (ICP), using newly developed metallocene (MCN) catalysis technology to capitalize on the benefits such catalysts provide. Homopolymers prepared with such "single-site" catalysts often have a narrow molecular weight distribution (MWD), low extractables, and a variety of other favorable properties associated therewith, and copolymers often also have narrow composition distributions.

Unfortunately, MCN catalysts for polypropylene have generally been limited by their inability to produce isotactic polypropylene (iPP) or propylene-ethylene copolymers of high molecular weight or other desired properties. Compared to their Ziegler-Natta (ZN) catalyzed counterparts, the iPP matrix of the ICP prepared using MCN has a low porosity, and is unable to hold a sufficiently high rubber content within the iPP matrix required for toughness and impact resistance. The formation of rubber in a separate phase outside the matrix is undesirable, e.g., it can result in severe reactor fouling.

A key enabling factor to making an improved ICP with step out properties is to obtain an MCN catalyst system capable of making an iPP matrix with stiffness properties comparable to or better than conventional ZN-catalyzed iPP. To provide efficiency and flexibility for commercial polymerization processes, this catalyst system should also be capable of producing high molecular weight polymer at high catalyst activities in the presence of low or zero hydrogen concentrations. Such a catalyst system optimizes flexibility for production of different polymer grades, because hydrogen concentration can be used as a lever to reduce molecular weight in the reactor. Unfortunately, MCN catalyst systems often have low activities at low or zero hydrogen concentrations. While addition of hydrogen increases MCN catalyst activities, it can also result in polymers with lower molecular weights than what is desirable.

A further disadvantage of MCN catalysts is the requirement of large amounts of expensive activator, such as an aluminoxane, to activate the catalysts. Additionally, while homogeneous metallocene catalysts can be used in solution phase reactors, MCN catalysts generally need to be supported to be used in most other polymerization processes. Thus, while many metallocene catalysts are capable of making polyolefins with commercially desirable properties, the catalysts are often not practical or economical on an industrial scale due to the large amount of activator needed and difficulties in incorporating the catalyst and activator on a support.

It is important to find a way to incorporate the MCN and cocatalyst onto the support without losing the advantages of the homogenous MCN compound, including high catalyst activity, stereochemical control, and the ability to tailor polymer properties. Identifying the optimum properties for MCN catalyst supports is an area of significant research interest. Both the nature of the support and the method used to integrate the support and/or activator can affect the catalyst activity and the final properties of the polymer.

Although aluminoxanes are expensive, supported catalysts with higher aluminoxane loadings are desirable in some circumstances. For example, when the metallocene compound has low activity or low activation efficiency or when a multi-catalyst precursor system is used where the total catalyst precursor loadings are higher than usual, higher aluminoxane loading may be required to achieve a commercially viable catalyst activity. In polymerization processes where liquid solvent is present, such as slurry and condensed mode processes, methyl aluminoxane (MAO) is soluble in the solvent and can leach out of the silica particles. It has generally not been possible with conventional silicas, e.g., Grace 948 or 955, PQ ES 70 or ES 757, to load more than about 8 to 9 mmol Al/g of silica onto the support without leaching of MAO (and possibly catalyst) into the solvent medium. This leaching can cause fouling and fines in the reactor system and can negatively impact catalyst activity and polymer properties.

It is also important for a catalyst support to be able to retain mechanical strength under the operating conditions of the process in which it is used. Many polymerization processes take place at significantly higher than ambient temperatures and pressures. If the mechanical strength of the support is compromised, the impregnated silica particles can fragment. This can also lead to activator and catalyst leaching into the solvent medium. Additionally, polymerization can start to take place on the smaller fragmented particles, leading to agglomerates within the reactor system that can cause fouling, plugging, and other problems.

There is a need for supported MCN catalyst systems capable of polymerizing polymers with high molecular weights at low or zero hydrogen concentrations and high catalyst activities. There is a need for supports compatible with such catalyst systems that can maintain the mechanical strength necessary for a variety of polymerization process and load sufficient activator, e.g., aluminoxane, to achieve high catalyst activities.

SUMMARY OF THE INVENTION

This invention relates to supported metallocene catalyst systems and uses thereof, the catalyst systems comprising asymmetrically substituted indenyl groups, high surface area supports, and aluminoxane activators.

Specifically, this invention is directed to olefin polymerization catalyst systems comprising:

i) a MCN catalyst compound represented by the formula:

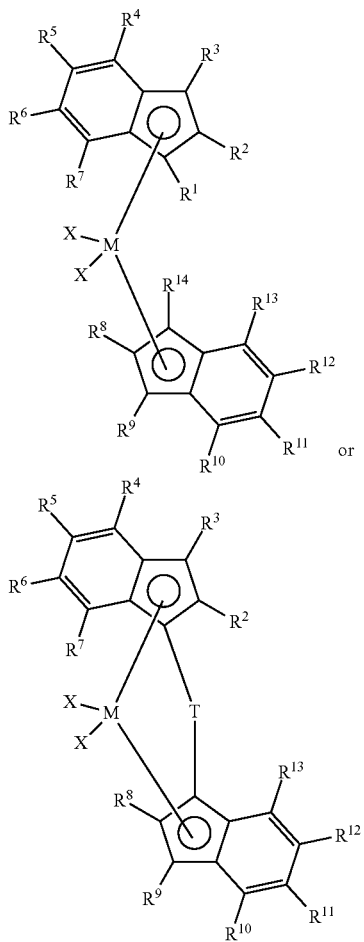

wherein $R^2$ and $R^8$ are, independently, a $C_1$ to $C_{20}$ linear alkyl group, provided that at least one of $R^2$ and $R^8$ must have at least 4 carbon atoms;
$R^4$ and $R^{10}$ are substituted or unsubstituted aryl groups;
M is a transition metal selected from Group 2, 3, or 4 of the Periodic Table;
T is a bridging group;
each X is an anionic leaving group;
each $R^1$, $R^3$, $R^5$, $R^6$, $R^7$, $R^9$, $R^{11}$, $R^{12}$, $R^{13}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;
wherein either or both of $R_5$ and $R_6$ and $R_{11}$ and $R_{12}$ optionally join together to form a ring structure; and
ii) a support having an average surface area of from about 400 to 800 m²/g; and
iii) an aluminoxane.

This invention is also directed to processes for polymerizing olefins, using the catalyst systems disclosed herein, including processes for producing iPP. The processes generally comprise contacting one or more olefins, such as propylene, with a catalyst system comprising an activator and a MCN catalyst compound according to the formula above, and obtaining a polymer. This invention is also directed to processes for producing impact copolymers comprising further contacting iPP with ethylene and optional comonomer to produce the impact copolymer. The processes may involve staged hydrogen addition, comprising contacting the catalyst system with propylene at a first hydrogen concentration in the reactor, and then adjusting to a second hydrogen concentration and obtaining iPP having a bimodal molecular weight distribution.

DEFINITIONS

For purposes of this disclosure and the claims appended thereto, the new numbering scheme for the Periodic Table Groups is used as described in CHEMICAL AND ENGINEERING NEWS, 63(5), p. 27, (1985).

For purposes herein, particle size (PS), and distributions thereof, are determined by laser diffraction using a MASTERSIZER 3000 (range of 1 to 3500 μm) available from Malvern Instruments, Ltd., Worcestershire, England, or an LS 13 320 MW with a micro liquid module (range of 0.4 to 2000 μm) available from Beckman Coulter, Inc., Brea, Calif. Average PS refers to the distribution of particle volume with respect to particle size. Unless otherwise indicated expressly or by context, "particle" refers to the overall particle body or assembly such as an aggregate, agglomerate, or encapsulated agglomerate, rather than subunits or parts of the body, such as the primary particles in agglomerates or the elementary particles in an aggregate.

For purposes herein, the surface area (SA, also called the specific surface area or BET surface area), pore volume (PV), and pore diameter (PD) of catalyst support materials are determined by the Brunauer-Emmett-Teller (BET) method using adsorption-desorption of nitrogen (temperature of liquid nitrogen: 77 K) with a MICROMERITICS TRISTAR II 3020 instrument or MICROMERITICS ASAP 2420 instrument after degassing of the powders for 4 to 8 hours at 100 to 300° C. for raw/calcined silica or 4 hours to overnight at 40 to 100° C. for silica supported aluminoxane. More information regarding the method can be found, for example, in "Characterization of Porous Solids and Powders: Surface Area, Pore Size and Density," S. Lowell et al., Springer, 2004. PV refers to the total PV, including both internal and external PV.

The term "agglomerate" as used herein refers to a material comprising an assembly of primary particles held together by adhesion, i.e., characterized by weak physical interactions such that the particles can easily be separated by mechanical forces, e.g., particles joined together mainly at corners or edges. The term "primary particles" refers to the smallest, individual disagglomerable units of particles in an agglomerate (without fracturing), and may in turn be an encapsulated agglomerate, an aggregate or a monolithic particle. Agglomerates are typically characterized by having an SA not appreciably different from that of the primary particles of which it is composed. Silica agglomerates are prepared commercially, for example, by a spray drying process.

Figure 1:
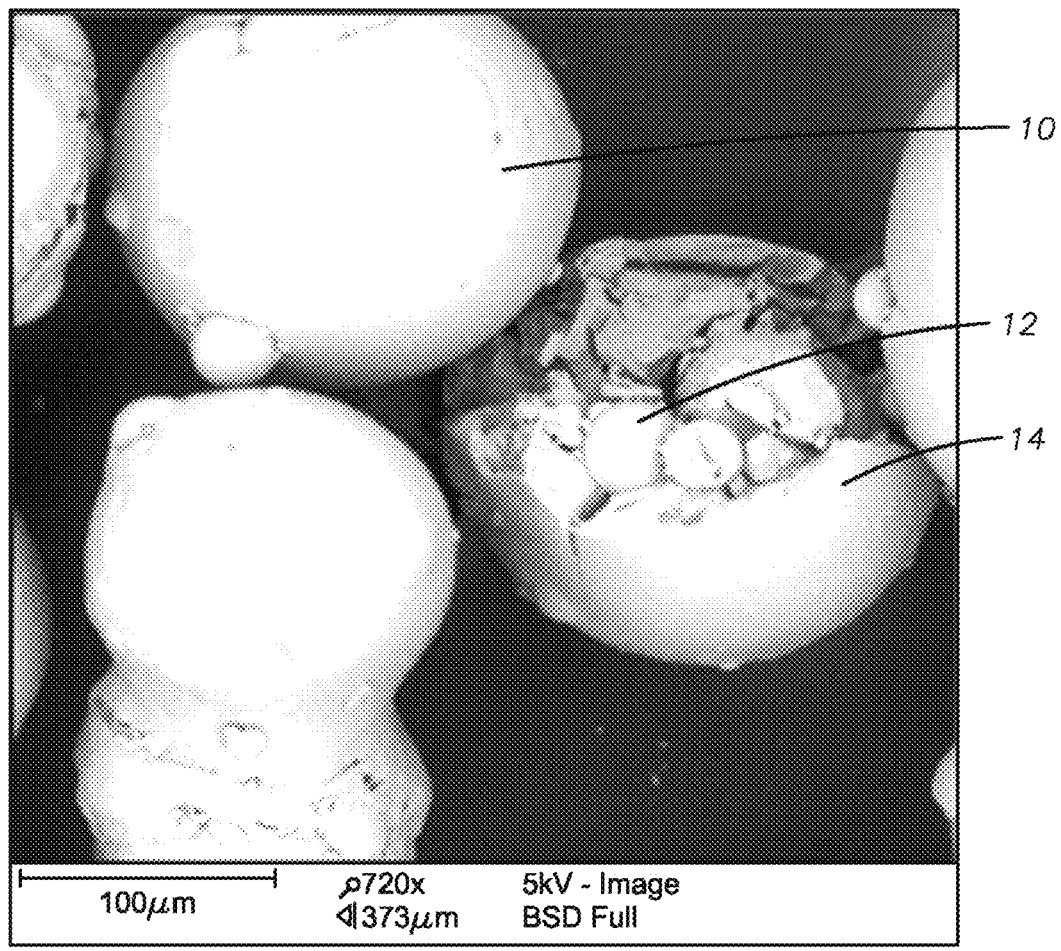
FIG. 1 is an electron micrograph showing D 150-60A silica comprising agglomerated primary particles.
Figure 2:
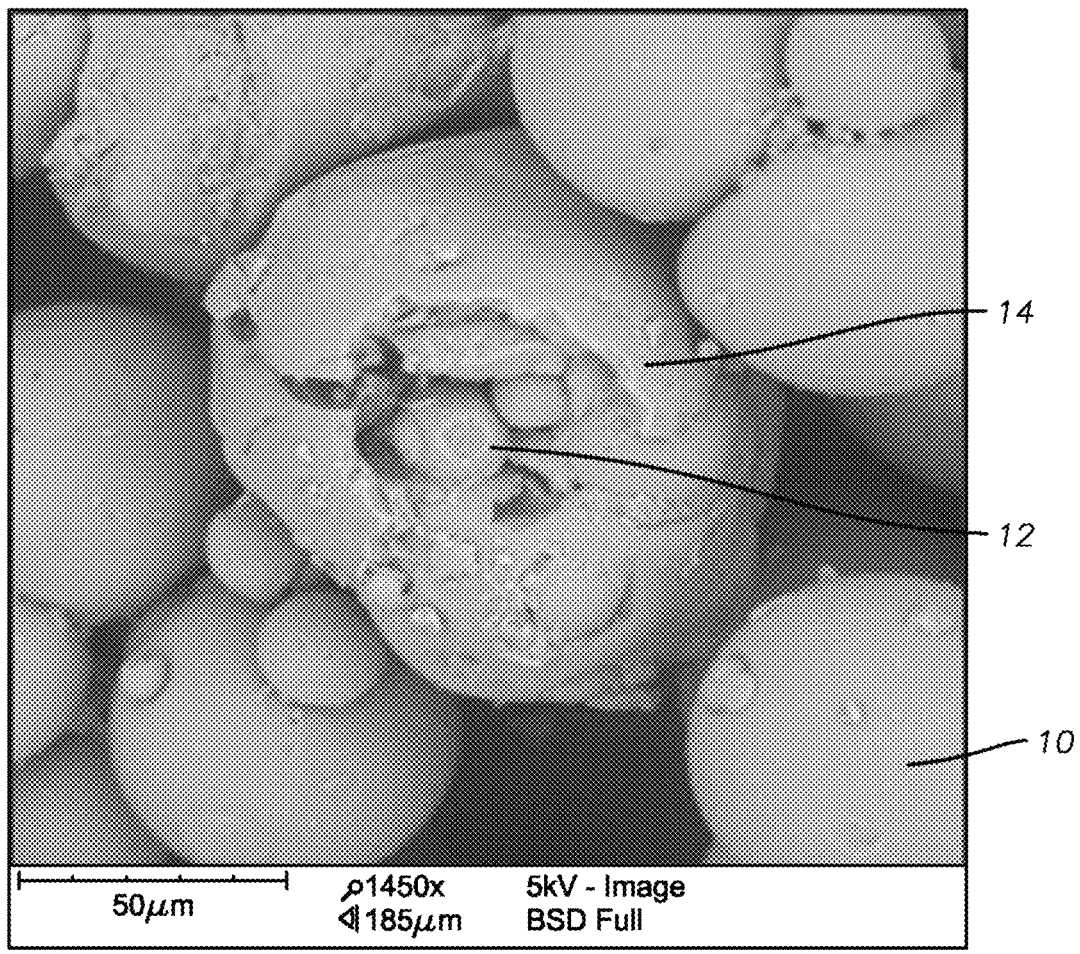
FIG. 2 is an electron micrograph showing PD 13054 silica comprising agglomerated primary particles.

FIGS. 1 and 2 show examples of encapsulated agglomerates 10, which, as seen in the partially opened particles, are comprised of a plurality of primary particles 12. FIG. 1 shows an electron micrograph of D 150-60A silica (Asahi Glass Co., Ltd. Or AGC Chemicals Americas, Inc.), which appears as generally spherical particles or grains 10, which, as seen in a partially opened particle, are actually agglomerates comprised of a plurality of substructures or primary particles 12 within the outer spherical shell or aggregate surface 14 that partially or wholly encapsulates the agglomerates. Likewise, FIG. 2 is an electron micrograph of PD 13054 (PQ Corporation) showing interior agglomerates 10 comprised of around 5-50 µm primary particles 12 and encapsulating aggregate 14. The examples shown are for illustrative purposes only and the sizes of the particles shown may not be representative of a statistically larger sample; the majority of the primary particles in this or other commercially available silicas may be larger or smaller than the image illustrated, e.g., 2 µm or smaller, depending on the particular silica production process employed by the manufacturer.

"Aggregates" are an assembly of elementary particles sharing a common crystalline structure, e.g., by a sintering or other physico-chemical process such as when the particles grow together. Aggregates are generally mechanically unbreakable, and the specific surface area of the aggregate is substantially less than that of the corresponding elementary particles. An "elementary particle" refers to the individual particles or grains in or from which an aggregate has been assembled. For example, the primary particles in an agglomerate may be elementary particles or aggregates of elementary particles. For more information on agglomerates and aggregates, see Walter, D., Primary Particles—Agglomerates—Aggregates, in Nanomaterials (ed Deutsche Forschungsgemeinschaft), Wiley-VCH Verlag GmbH & Co. KGaA, Weinheim, Germany, doi: 10.1002/9783527673919, pp. 1-24 (2013).

Figure 3:
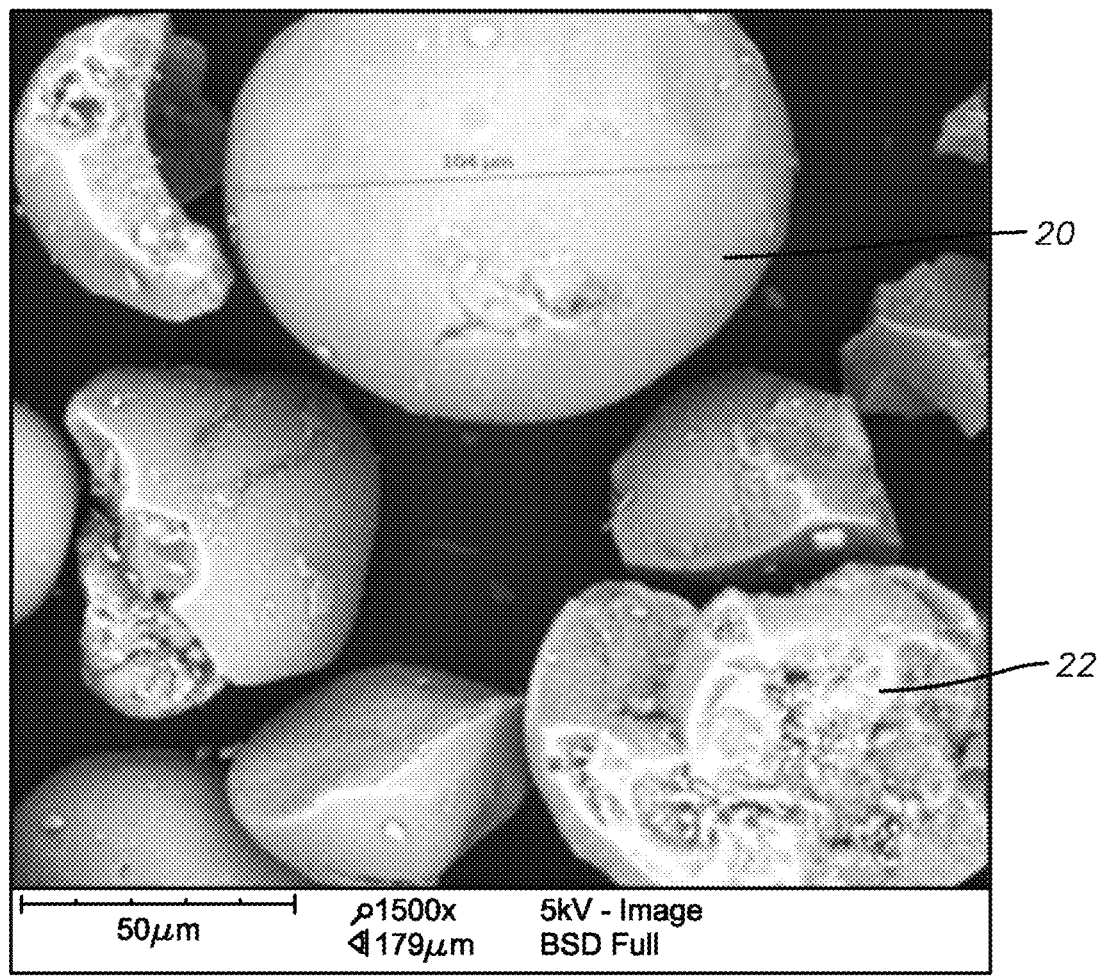
FIG. 3 is an electron micrograph showing a comparative MS 3050 silica.

The terms "monolith" or "monolithic" refer to a material formed of a single mass of material, and include aggregates as well as bulk materials without any defined geometry or grain structure. FIG. 3 shows a comparative support MS 3050, comprised of generally spherical particles 20 with an entirely aggregated or monolithic core 22, lacking the agglomerated primary particles and internal pore morphology of the FIG. 1-2 supports.

The terms "capsule" or "encapsulated" or "microencapsulated" are used interchangeably herein to refer to an agglomerate in the 1-1000 µm size range comprising an exterior surface that is coated or otherwise has a physical barrier that inhibits disagglomeration of the primary particles from the interior of microencapsulated agglomerate. The barrier or coating may be an aggregate, for example, of primary and/or elementary particles otherwise constituted of the same material as the agglomerate. FIGS. 1-2 show examples of microencapsulated agglomerates 10 comprised of a plurality of primary particles 12 within an outer aggregate surface or shell 14 that partially or wholly encapsulates the agglomerates, in which the primary particles may be allowed to disagglomerate by fracturing, breaking, dissolving, chemically degrading or otherwise removing all or a portion of the shell 14.

In the case of spray dried, amorphous, hydrated-surface silica as one example, the agglomerates 10 may typically have an overall size range of 1-300 µm (e.g., 30-200 µm), the primary particles 12 a size range of 0.001-50 µm (e.g., 50-400 nm or 1-50 µm), and the elementary particles a size range of 1-400 nm (e.g., 5-40 nm). As used herein, "spray dried" refers to metal oxide such as silica obtained by expanding a sol in such a manner as to evaporate the liquid from the sol, e.g., by passing the silica sol through a jet or nozzle with a hot gas.

As used herein, Mn is number average molecular weight, Mw is weight average molecular weight, Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weights (e.g., Mw, Mn, and Mz) are g/mol and are determined as described below.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

"Asymmetric" as used in connection with the instant indenyl compounds means that the substitutions at the 4 positions are different, or the substitutions at the 2 positions are different, or the substitutions at the 4 positions are different and the substitutions at the 2 positions are different.

Amounts of rac and meso isomers in the MCN catalyst compound are determined by proton NMR. Specifically, $^1$H NMR data are collected at 23° C. in a 5 mm probe using a 400 MHz Bruker spectrometer with deuterated methylene chloride or deuterated benzene. Data is recorded using a maximum pulse width of 45°, 8 seconds between pulses and signal averaging 16 transients. The spectrum is normalized to protonated methylene chloride in the deuterated methylene chloride, which is expected to show a peak at 5.32 ppm.

The terms "hydrocarbyl radical", "hydrocarbyl" and "hydrocarbyl group" are used interchangeably throughout this document. Likewise, the terms "group", "radical", and "substituent" are also used interchangeably in this document. For purposes of this disclosure, "hydrocarbyl radical" is defined to be a radical, which contains hydrogen atoms and up to 100 carbon atoms and which may be linear, branched, or cyclic, and when cyclic, aromatic or non-aromatic.

A substituted hydrocarbyl radical is a hydrocarbyl radical where at least one hydrogen has been replaced by a heteroatom or heteroatom containing group.

Halocarbyl radicals are radicals in which one or more hydrocarbyl hydrogen atoms have been substituted with at least one halogen (e.g., F, Cl, Br, I) or halogen-containing group (e.g., $CF_3$).

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like, where $R^*$ is independently a hydrocarbyl or halocarbyl radical and two or more $R^*$ may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^*_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like, where $R^*$ is independently a hydrocarbyl or halocarbyl radical and two or more $R^*$ may join together to form a substituted or unsubstituted saturated, partially unsaturated or aromatic cyclic or polycyclic ring structure.

An aryl group is defined to be a single or multiple fused ring group where at least one ring is aromatic. Examples of aryl and substituted aryl groups include phenyl, naphthyl, anthracenyl, methylphenyl, isopropylphenyl, tert-butylphenyl, cyclopropyl, cyclobutyl, cyclopentyl, cyclohexyl, carbazolyl, indolyl, pyrrolyl, and cyclopenta[b]thiopheneyl. Preferred aryl groups include phenyl, benzyl, carbazolyl, naphthyl, and the like.

In using the terms "substituted cyclopentadienyl", or "substituted indenyl", or "substituted aryl", the substitution to the aforementioned is on a bondable ring position, and each occurrence is selected from hydrocarbyl, substituted hydrocarbyl, halocarbyl, substituted halocarbyl, silylcarbyl, germylcarbyl, a halogen radical, or a polar group. A "bondable ring position" is a ring position that is capable of bearing a substituent or bridging substituent. For example, cyclopenta[b]thienyl has five bondable ring positions (at the carbon atoms) and one non-bondable ring position (the sulfur atom); cyclopenta[b]pyrrolyl has six bondable ring positions (at the carbon atoms and at the nitrogen atom). Thus, in relation to aryl groups, the term "substituted" indicates that a hydrogen group has been replaced with a hydrocarbyl, substituted hydrocarbyl, halocarbyl, substituted halocarbyl, silylcarbyl, germylcarbyl, a halogen radical, or a polar group. For example, "methyl phenyl" is a phenyl group having had a hydrogen replaced by a methyl group.

For purposes of this disclosure, room temperature (RT) is 23° C.

DETAILED DESCRIPTION

This invention relates to supported MCN olefin polymerization catalyst systems comprising asymmetrically substituted indenyl groups, high surface area supports, and aluminoxane activators, and uses thereof. Specifically, this invention is directed to olefin polymerization catalyst systems comprising:

i) a MCN catalyst compound represented by the formula:

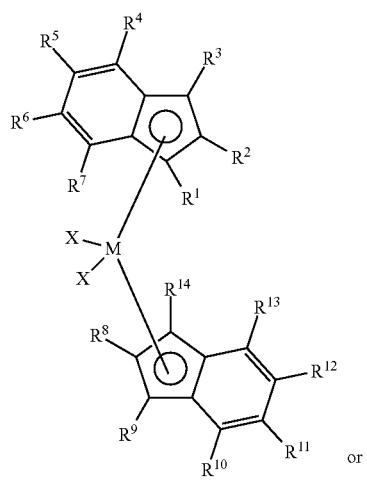

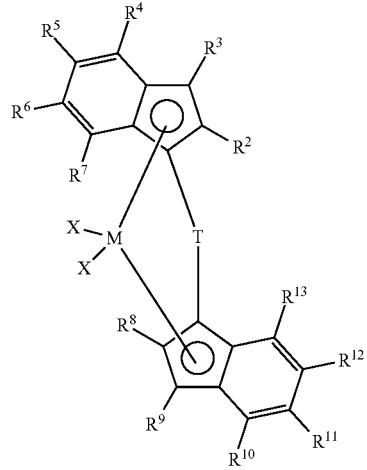

-continued wherein $R^2$ and $R^8$ are, independently, a $C_1$ to $C_{20}$ linear alkyl group, provided that at least one of $R^2$ and $R^8$ has at least 4 carbon atoms, preferably at least 6 carbon atoms, and preferably $R^2$ and $R^8$ have no branches at the alpha or beta positions;

$R^4$ and $R^{10}$ are substituted or unsubstituted aryl groups (such as substituted or unsubstituted phenyl groups, preferably substituted phenyl groups), preferably at least one of the aryl groups is: 1) substituted at an othro position with at least one group selected from $C_1$ to $C_{40}$ hydrocarbyls, heteroatoms, and heteroatom containing groups and/or 2) substituted at the 3', 4' or 5' position with at least one group selected from $C_1$ to $C_{40}$ hydrocarbyls, heteroatoms, and heteroatom containing groups;

M is a transition metal selected from Group 2, 3, or 4 of the Periodic Table, preferably a Group 4 transition metal;

T is a bridging group;

each X is an anionic leaving group;

each $R^1$, $R^3$, $R^5$, $R^6$, $R^7$, $R^9$, $R^{11}$, $R^{12}$, $R^{13}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;

wherein either or both of $R_5$ and $R_6$ and $R_{11}$ and $R_{12}$ optionally join together to form a ring structure; and ii) a support having an average surface area of from about 400 to 800 m²/g; and iii) an aluminoxane.

The MCN catalyst systems disclosed herein produce high molecular weight polymers at high catalyst activities in the presence of low or zero hydrogen concentrations. For example, the catalyst systems can produce high molecular weight iPP, including bimodal iPP, with excellent stiffness properties and a melt flow rate (MFR) in the range of interest for ICP applications. The high surface area supports of the MCN catalyst systems disclosed herein enable higher activator loading on the supports than what has conventionally been possible, which is believed to contribute to the high catalyst activities achieved.

This invention is also directed to processes for polymerizing olefins, including processes for producing iPP. The processes generally comprise contacting one or more olefins, such as propylene, with a catalyst system comprising an activator and a MCN catalyst compound according to the formula above, and obtaining a polymer. This contacting may be done in a reactor in the absence of any hydrogen added to the reactor. This invention is also directed to processes for producing impact copolymers comprising further contacting iPP with ethylene to produce the impact copolymer. The processes may involve staged hydrogen addition, comprising contacting the catalyst system with propylene at a first hydrogen concentration in the reactor, and then adjusting to a second hydrogen concentration and obtaining iPP having a bimodal molecular weight distribution.

The catalyst systems of the invention are particularly useful for making bimodal iPP in slurry phase processes. A known process for making bimodal iPP in slurry phase involves two slurry loop reactors and typically utilizes a ZN catalyst system. The high molecular weight (HMW) component of the bimodal iPP is made in a first slurry loop reactor and the low molecular weight (LMW) component is made in a second slurry loop reactor. In such processes, the first slurry loop reactor requires no or very low hydrogen concentrations because a HMW polymer is desired and hydrogen lowers the molecular weight of the polymer formed. Hydrogen may be used more liberally in the second slurry loop reactor where an LMC polymer is desired. Thus, the capability of the catalyst systems of the invention to produce high molecular weight polymers at high catalyst activities and no or low hydrogen concentrations is particularly useful in these processes.

Preferred embodiments of the catalyst system and associated components are described in more detail below.

Metallocene Catalyst Compounds: This invention is directed to olefin polymerization catalyst systems comprising an MCN catalyst compound represented by the formula:

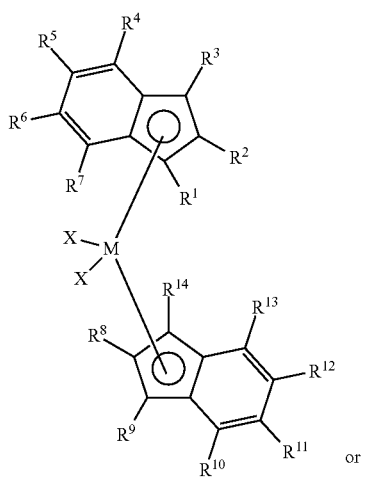

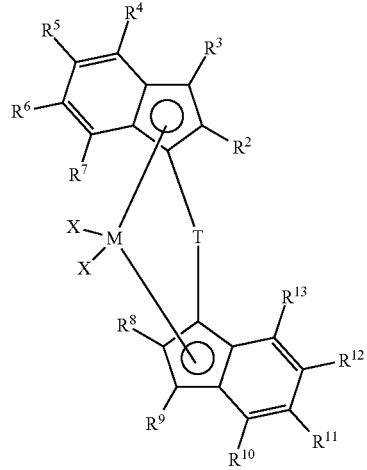
-continued wherein $R^2$ and $R^8$ are, independently, a $C_1$ to $C_{20}$ linear alkyl group, provided that at least one of $R^2$ and $R^8$ has at least 4 carbon atoms, preferably at least 6 carbon atoms, and preferably $R^2$ and $R^8$ have no branches at the alpha or beta positions;

$R^4$ and $R^{10}$ are substituted or unsubstituted aryl groups, such as substituted or unsubstituted phenyl groups, and preferably substituted phenyl groups (such as substituted or unsubstituted phenyl groups, preferably substituted phenyl groups), preferably at least one of the aryl groups is: 1) substituted at an othro position with at least one group selected from $C_1$ to $C_{40}$ hydrocarbyls, heteroatoms, and heteroatom containing groups and/or 2) substituted at the 3', 4' or 5' position with at least one group selected from $C_1$ to $C_{40}$ hydrocarbyls, heteroatoms, and heteroatom containing groups;

M is a transition metal selected from Group 2, 3, or 4 of the Periodic Table, and preferably a Group 4 transition metal;

T is a bridging group;

each X is an anionic leaving group;

each $R^1$, $R^3$, $R^5$, $R^6$, $R^7$, $R^9$, $R^{11}$, $R^{12}$, $R^{13}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents; and either or both of $R_5$ and $R_6$ and $R_{11}$ and $R_{12}$ optionally join together to form a ring structure.

M may be Hf, Ti and/or Zr, particularly Hf and/or Zr, particularly Zr.

$R^2$ may be a linear $C_1$-$C_{10}$ alkyl group, such as methyl, ethyl, n-propyl, n-butyl, n-pentyl, n-hexyl, n-heptyl, n-octyl, n-nonyl or n-decyl) which may be halogenated, preferably with I, F, Cl or Br.

$R^8$ may be a linear $C_1$-$C_{10}$ alkyl group, preferably methyl, ethyl, n-propyl, n-butyl, n-pentyl, n-hexyl, n-heptyl, n-octyl, n-nonyl or n-decyl) which may be halogenated, preferably with I, F, Cl or Br.

$R^2$ and $R^8$ may be the same linear alkyl group, such as n-butyl, n-hexyl, and so forth. Additionally, $R^2$ and $R^8$ may be different. For example, $R^2$ may be methyl and $R^8$ may be n-butyl, n-pentyl, n-hexyl, n-heptyl, n-octyl, and so forth.

The term "substituted phenyl group" means a phenyl that is substituted with 1, 2, 3, 4, or 5 $C_1$ to $C_{20}$ substituted or unsubstituted hydrocarbyl groups, such as methyl, ethyl, propyl, butyl, pentyl, hexyl, heptyl, octyl, nonyl, decyl, undecyl, dodecyl, phenyl, substituted phenyl, biphenyl, or an isomer thereof. In useful embodiments, the phenyl group is substituted at the meta or para positions, preferably the 3' and/or 5' positions, and preferably with $C_4$ to $C_{12}$ alkyl groups. The phenyl group may also be substituted at the 2' position, but is preferably not substituted at both the 2' and 6' positions. In other words, in a preferred embodiment of the invention, when the 2' position of the phenyl is substituted, the 6' position is hydrogen. The phenyl group may be substituted at the 4' position with a group of the formula $(XR'_n)^-$, wherein X is a Group 14, 15 16, or 17 heteroatom; R' is a hydrogen atom, halogen atom, a $C_1$-$C_{10}$ alkyl group, or a $C_6$-$C_{10}$ aryl group; n is 0, 1, 2, or 3; —$NR'_2$, —$SR'$, —$OR'$, —$OSiR'_3$, —$SiR'_3$, or —$PR'_2$; and optionally one or more of the remaining positions on the phenyl are substituted, such as the 2', 3' and or 5' positions.

In another aspect the 4' position on the aryl group is not a $C_4$ group, alternately is not a hydrocarbyl group.

$R^4$ and $R^{10}$ may be independently substituted phenyl groups, preferably phenyl groups substituted with $C_1$ to a $C_{10}$ alkyl groups (such as t-butyl, sec-butyl, n-butyl, isopropyl, n-propyl, cyclopropyl, cyclobutyl, cyclopentyl, cyclohexyl, cycloheptyl, cyclooctyl, phenyl, mesityl, or adamantyl), or an aryl group which may be further substituted with an aryl group, and the two aryl groups bound together can be joined together directly or by linker groups, wherein the linker group is an alkyl, vinyl, phenyl, alkynyl, silyl, germyl, amine, ammonium, phosphine, phosphonium, ether, thioether, borane, borate, alane, or aluminate groups.

At least one of $R^4$ and $R^{10}$ may be a phenyl group substituted at the 3' and 5' positions with $C_1$ to $C_{10}$ alkyl groups, aryl groups, or combinations thereof.

At least one of $R^4$ and $R^{10}$ may be a phenyl group substituted at the 2' position with an alkyl or an aryl group, such as another phenyl group.

At least one of $R^4$ and $R^{10}$ may be a phenyl group substituted at the 3' and 5' positions and at least one of $R^4$ and $R^{10}$ may be a phenyl group substituted at the 2' position with an alkyl or aryl group, such as another phenyl group.

At least one of $R^4$ and $R^{10}$ may be a phenyl group substituted at the 3' and 5' positions with $C_1$ to a $C_{10}$ alkyl groups, such as a tertiary butyl group.

At least one of $R^4$ and $R^{10}$ may be a phenyl group substituted at the 3' and 5' positions with a $C_1$ to $C_{10}$ alkyl group, such as a tertiary butyl group, and at least one of $R^4$ and $R^{10}$ may be a phenyl group substituted at the 2' position with an alkyl or an aryl group, such as a phenyl group.

At least one of $R^4$ and $R^{10}$ may be a phenyl group substituted at the 3' and 5' positions with $C_1$ to $C_{10}$ alkyl groups, such as a tertiary butyl group, and optionally at the 4' position with $(XR'_n)^-$, wherein X is a Group 14, 15, 16, or 17 heteroatom having an atomic weight of 13 to 79; R' may be one of a hydrogen atom, halogen atom, a $C_1$-$C_{10}$ alkyl group, or a $C_6$-$C_{10}$ aryl group; and n may be 0, 1, 2, or 3, such as methoxy; and at least one of $R^4$ and $R^{10}$ may be a phenyl group substituted at the 2' position with an alkyl or an aryl group, such as another phenyl group.

Both $R^4$ and $R^{10}$ may be a phenyl group substituted at the 3' and 5' positions with $C_1$ to $C_{10}$ alkyl groups, such as a tertiary butyl group.

At least one of $R^4$ and $R^{10}$ may be a phenyl group substituted at the 3' and 5' positions with aryl groups, such as substituted or unsubstituted phenyl groups.

Both $R^4$ and $R^{10}$ may be a phenyl group substituted at the 3' and 5' positions with aryl groups, such as substituted or unsubstituted phenyl groups.

At least one of $R^4$ and $R^{10}$ may be an aryl group substituted at 3' and 5' positions with $C_1$ to $C_{10}$ alkyl groups (such as t-butyl, sec-butyl, n-butyl, isopropyl, n-propyl, cyclopropyl, cyclobutyl, cyclopentyl, cyclohexyl, cycloheptyl, cyclooctyl, phenyl, mesityl, or adamantyl) or aryl groups and combinations thereof, wherein when $R^4$ or $R^{10}$ is a phenyl group that is further substituted with an aryl group, the two groups bound together can be joined directly or by linker groups, wherein the linker group is an alkyl, vinyl, phenyl, alkynyl, silyl, germyl, amine, ammonium, phosphine, phosphonium, ether, thioether, borane, borate, alane, or aluminate group.

When at least one of $R^4$ and $R^{10}$ is a phenyl group substituted at 3' and 5' positions, the phenyl group may also be substituted at the 4' position, preferably with a substituent is selected from $(XR'_n)^-$, wherein X is a Group 14, 15, 16 or 17 heteroatom having an atomic weight of 13 to 79 (preferably N, O, S, P, or Si) and R' is one of a hydrogen atom, halogen atom, a $C_1$-$C_{10}$ alkyl group (such as methyl, ethyl, propyl, butyl, pentyl, hexyl, octyl, nonyl, decyl or an isomer thereof), or a $C_6$-$C_{10}$ aryl group and n is 0, 1, 2, or 3; preferably $(XR'_n)^-$ is —$NR'_2$, —$SR'$, —$OR'$, —$OSiR'_3$, —$SiR'_3$, or —$PR'_2$, preferably $(XR'_n)^-$ is —$NR'_2$, —$SR'$, —$OR'$, —$OSiR'_3$, or —$PR'_2$, preferably $(XR'_n)^-$ is —$SR'$, —$OR'$, or —$OSiR'_3$, preferably $(XR'_n)^-$ is —$NR'_2$ or —$PR'_2$, or preferably $(XR'_n)^-$ is —$OR'$ m preferably where R' is a $C_1$-$C_{10}$ alkyl group, particularly a methoxy, ethoxy, n-propoxy, isopropoxy, n-butoxy, iso-butoxy, sec-butoxy, or t-butoxy group, most particularly methoxy.

Preferred catalyst compounds include one or more of rac-dimethylsilyl (4-o-biphenyl-2-n-hexyl-indenyl) (2-methyl-4-(3',5'-di-tert-butyl-4'-methoxy-phenyl)-indenyl) zirconium dichloride (MCN1 in Table 1), rac-dimethylsilyl bis(4-o-biphenyl-2-n-butyl-indenyl) zirconium dichloride (MCN2 in Table 1) and rac-dimethylsilyl (4-o-biphenyl-2-n-butyl indenyl) (4-(3',5'-di-tert-butyl-4'-methoxyphenyl)-2-methyl-1,5,6,7-tetrahydro-s-indacenyl) zirconium dichloride (MCN8 in Table 1).

In another aspect, M is Hf, Ti and/or Zr, particularly Hf and/or Zr, particularly Zr.

Suitable radicals for the each of the groups $R^1$, $R^3$, $R^5$, $R^6$, $R^7$, $R^9$, $R^{11}$, $R^{12}$, $R^{13}$, and $R^{14}$ are selected from hydrogen or hydrocarbyl radicals including methyl, ethyl, ethenyl, and all isomers (including cyclics such as cyclohexyl) of propyl, butyl, pentyl, hexyl, heptyl, octyl, nonyl, decyl, undecyl, dodecyl, propenyl, butenyl, and from halocarbyls and all isomers of halocarbyls including perfluoropropyl, perfluorobutyl, perfluoroethyl, perfluoromethyl, and from substituted hydrocarbyl radicals and all isomers of substituted hydrocarbyl radicals including trimethylsilylpropyl, trimethylsilylmethyl, trimethylsilylethyl, and from phenyl, and all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like; from all isomers of halo substituted phenyl (where halo is, independently, fluoro, chloro, bromo and iodo) including halophenyl, dihalophenyl, trihalophenyl, tetrahalophenyl, and pentahalophenyl; and from all isomers of halo substituted hydrocarbyl substituted phenyl (where halo is, independently, fluoro, chloro, bromo and iodo) including halomethylphenyl, dihalomethylphenyl, (trifluoromethyl)phenyl, bis(triflouromethyl)phenyl; and from all isomers of benzyl, and all isomers of hydrocarbyl substituted benzyl including methylbenzyl, dimethylbenzyl. Either or both of $R_5$ and $R_6$ and $R_{11}$ and $R_{12}$ may optionally join together to form a ring structure.

Each X may independently be selected from the group consisting of hydrocarbyl radicals having from 1 to 20 carbon atoms, hydrides, amides, alkoxides, sulfides, phosphides, halides, dienes, amines, phosphines, ethers, and a combination thereof, and two X may form a part of a fused ring or a ring system.

Suitable examples for X include chloride, bromide, fluoride, iodide, hydride, and $C_1$ to $C_{20}$ hydrocarbyls, preferably methyl, ethyl, propyl, butyl, pentyl, hexyl, phenyl, benzyl, and all isomers thereof, or two X together are selected from $C_4$ to $C_{10}$ dienes, preferably butadiene, methylbutadiene, pentadiene, methylpentadiene, dimethylpentadiene, hexadiene, methylhexadiene, dimethylhexadiene, or from $C_1$ to $C_{10}$ alkylidenes, preferably methylidene, ethylidene, propylidene, or from $C_3$ to $C_{10}$ alkyldiyls, preferably propandiyl, butandiyl, pentandiyl, and hexandiyl. In particular aspects, X is chloride or methyl.

T may be selected from $R'_2C$, $R'_2Si$, $R'_2Ge$, $R'_2CCR'_2$, $R'_2CCR'_2CR'_2$, $R'C=CR'$, $R'C=CR'CR'_2$, $R'_2CSiR'_2$, $R'_2SiSiR'_2$, $R'_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, $R'B$, $R'_2C—BR'$, $R'_2C—BR'—CR'_2$, $R'N$, $R'_2C—NR'$, $R'_2C—NR'—CR'_2$, $R'P$, $R'_2C—PR'$, and $R'_2C—PR'—CR'_2$ where each R' is independently hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent.

Suitable examples for T may include dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene.

In particular aspects, T is $CH_2$, $CH_2CH_2$, $C(CH_3)_2$, $SiMe_2$, $SiPh_2$, $SiMePh$, $Si(CH_2)_3$, $Si(CH_2)_4$, $Si(Me_3SiPh)_2$, or $Si(CH_2)_5$.

T may also be represented by the formula $R^a_2J$, where J is C, Si, or Ge, and each $R^a$ is, independently, hydrogen, halogen, $C_1$ to $C_{20}$ hydrocarbyl, or $C_1$ to $C_{20}$ substituted hydrocarbyl, and two $R^a$ can form a cyclic structure including aromatic, partially saturated, or saturated cyclic or fused ring system.

In a preferred embodiment of the invention, T is represented by the formula, $(R^*_2G)_g$, where each G is C, Si, or Ge, g is 1 or 2, and each $R^*$ is, independently, hydrogen, halogen, $C_1$ to $C_{20}$ hydrocarbyl or a $C_1$ to $C_{20}$ substituted hydrocarbyl, and two or more $R^*$ can form a cyclic structure including aromatic, partially saturated, or saturated cyclic or fused ring system.

The racemic/meso ratio of the MCN catalyst compound may be 50:1 or greater, 40:1 or greater, 30:1 or greater, 20:1 or greater, 15:1 or greater, 10:1 or greater, 7:1 or greater, or 5:1 or greater.

The MCN catalyst compound may comprise greater than 55 mol % of the racemic isomer, greater than 60 mol % of the racemic isomer, greater than 65 mol % of the racemic isomer, greater than 70 mol % of the racemic isomer, greater than 75 mol % of the racemic isomer, greater than 80 mol % of the racemic isomer, greater than 85 mol % of the racemic isomer, greater than 90 mol % of the racemic isomer, greater than 92 mol % of the racemic isomer, greater than 95 mol % of the racemic isomer, greater than 98 mol % of the racemic isomer, based on the total amount of the racemic and meso isomer (if any) formed. In some aspects, the MCN catalyst compound consists essentially of the racemic isomer.

Amounts of rac and meso isomers are determined by proton NMR. $^1H$ NMR data are collected at 23° C. in a 5 mm probe using a 400 MHz Bruker spectrometer with deuterated methylene chloride or deuterated benzene. Data is recorded using a maximum pulse width of 45°, 8 seconds between pulses and signal averaging 16 transients. The spectrum is normalized to protonated methylene chloride in the deuterated methylene chloride, which is expected to show a peak at 5.32 ppm.

In a preferred embodiment of the invention, one catalyst compound is used, e.g., the catalyst compounds are not different. For purposes of this invention one metallocene catalyst compound is considered different from another if they differ by at least one atom. For example "bisindenyl zirconium dichloride" is different from (indenyl)(2-methylindenyl) zirconium dichloride" which is different from "(indenyl)(2-methylindenyl) hafnium dichloride." Catalyst compounds that differ only by isomer are considered the same for purposes if this invention, e.g., rac-dimethylsilylbis (2-methyl 4-phenyl)hafnium dimethyl is considered to be the same as meso-dimethylsilylbis(2-methyl 4-phenyl)hafnium dimethyl.

Additionally, two or more different MCN catalyst compounds may be present in the catalyst system used herein. For example, two or more different MCN catalyst compounds may be present in the reaction zone where the process(es) described herein occur. When two MCN catalyst compounds are used in one reactor as a mixed catalyst system, the two compounds should be chosen such that the two are compatible. A simple screening method such as by $^1H$ or $^{13}C$ NMR, known to those of ordinary skill in the art, can be used to determine which MCN catalyst compounds are compatible.

The transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Methods to Prepare the Catalyst Compounds: Generally, the MCN catalyst compounds disclosed herein may be synthesized as shown below where (i) is a deprotonation via a metal salt of alkyl anion (e.g., "BuLi) to form an indenide; (ii) is a reaction of indenide with an appropriate bridging precursor (e.g., Me₂SiCl₂); (iii) is a reaction of the above product with AgOTf; (iv) is a reaction of the above triflate compound with another equivalent of indenide; (v) is a double deprotonation via an alkyl anion (e.g., "BuLi) to form a dianion; and (vi) is a reaction of the dianion with a metal halide (e.g., ZrCl₄). The final products are obtained by recrystallization of the crude solids.

alumina, magnesia, titania, zirconia, and the like, and mixtures thereof. Also, combinations of these support materials may be used, for example, silica-chromium, silica-alumina, silica-titania, and the like.

The support preferably comprises silica, e.g., amorphous silica, which may include a hydrated surface presenting hydroxyl or other groups which can be deprotonated to form reactive sites to anchor activators and/or catalyst precursors. Other porous support materials may optionally be present with the silica as a co-support, for example, talc, other inorganic oxides, zeolites, clays, organoclays, or any other organic or inorganic support material and the like, or mixtures thereof. Silicas which may be suitable are commercially available under the trade designations PD 14024 (PQ Corporation), D70-120A (Asahi Glass Co., Ltd. or AGC Chemicals Americas, Inc.), and the like.

When a silica support is referred to herein, the silica support in raw form comprises at least 60 wt %, 70 wt %, 80 wt %, 90 wt %, 95 wt %, 98 wt %, or 99 wt % or more of

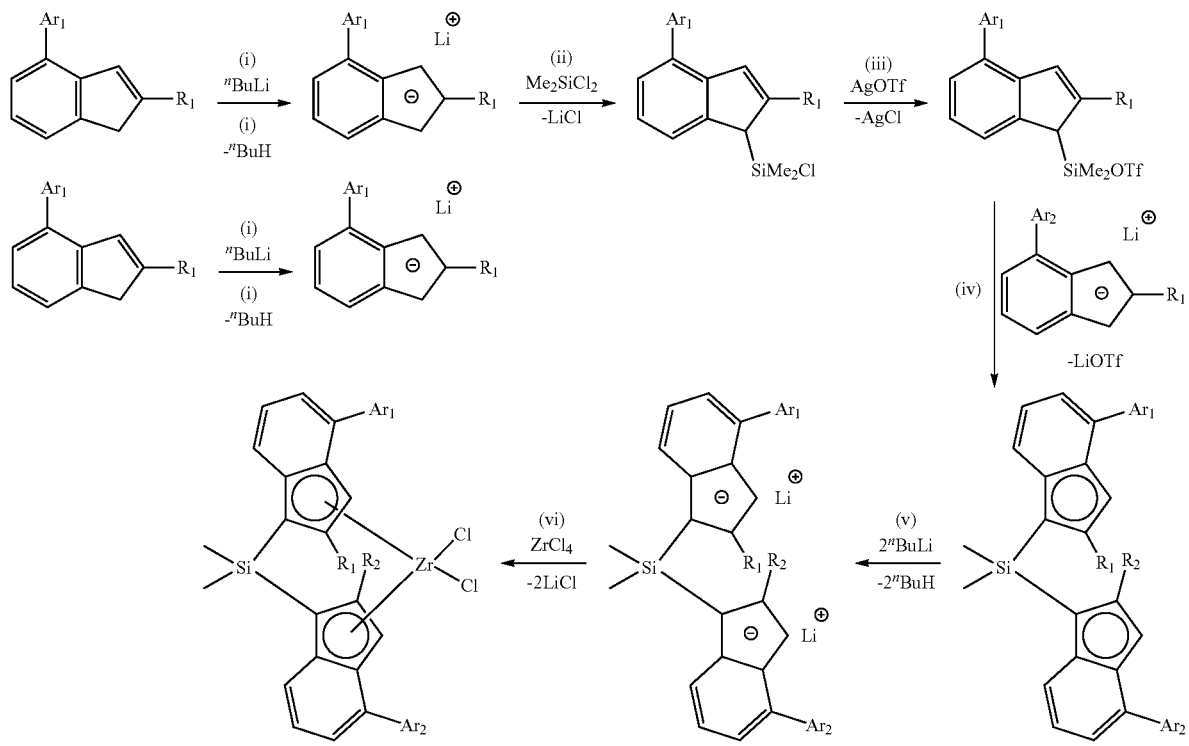

MCN catalyst compounds useful herein include: rac-dimethylsilyl (4-o-biphenyl-2-n-hexyl-indenyl) (2-methyl-4-(3',5'-di-tert-butyl-4'-methoxy-phenyl)-indenyl) zirconium dichloride (MCN1 in Table 1), rac-dimethylsilyl bis (4-o-biphenyl-2-n-butyl-indenyl) zirconium dichloride (MCN2 in Table 1) and rac-dimethylsilyl (4-o-biphenyl-2-n-butyl indenyl) (4-(3',5'-di-tert-butyl-4'-methoxyphenyl)-2-methyl-1,5,6,7-tetrahydro-s-indacenyl) zirconium dichloride (MCN8 in Table 1), etc.

Support: The catalyst systems comprise inert, porous solid particles as a support to which the catalyst precursor compound and/or activator may be anchored, bound, adsorbed or the like. The support material comprises an inorganic oxide in a finely divided form. Suitable inorganic oxide materials for use in MCN catalyst systems herein include Groups 2, 4, 13, and 14 metal oxides, such as silica, silica. The silica support may comprise up to 5 wt %, 10 wt %, 20 wt %, 30 wt %, or 40 wt % of another compound. The other compound may be any other support material discussed herein. The other compound may be a titanium, aluminum, boron, magnesium, or mixtures thereof. Additionally, the other compound may be a talc, other inorganic oxide, zeolite, clay, organoclay, or mixtures thereof. The silica support may also not include any substantial amount of any other compound, i.e., the silica support comprises less than 5 wt %, 1 wt %, 0.5 wt %, 0.2 wt %, or less of any other compound.

The support should be dry, that is, free of absorbed water. Drying of the support may be effected by heating or calcining above about 100° C., e.g., from about 100° C. to about 1000° C., preferably at least about 200° C. The silica support may be heated to at least 130° C., about 130° C. to about 850° C., or about 200° C. to about 600° C. for a time of 1 minute to about 100 hours, e.g., from about 12 hours to about 72 hours, or from about 24 hours to about 60 hours. The calcined support material may comprise at least some groups reactive with an organometallic compound, e.g., reactive hydroxyl (OH) groups to produce the supported catalyst systems of this invention.

The support may have an average surface area of from about 400 to 800 $m^2/g$ support and an average pore diameter of from about 60 to 200 Angstrom. The average surface area may range from a low of about 400, 500, 530, 540, 550, or 600 $m^2/g$ support to a high of about 600, 650, 700, 750, or 800 $m^2/g$ support, including any combination of any upper or lower value disclosed herein. The average pore diameter may range from a low of about 60, 70, 80, 90, 100, or 110 Angstrom to a high of about 120, 130, 150, 180, or 200 Angstrom, including any combination of any upper or lower value disclosed herein.

The support may have an average pore volume of from about 0.5 to 2.5 ml/g support. The average pore volume may range from a low of about 0.5, 0.7, 1.0, 1.1, 1.3, or 1.4 ml/g support to a high of about 1.5, 1.6, 1.8, 2.0, or 2.5 ml/g support, including any combination of any upper or lower value disclosed herein. The average pore volume may be about 0.5 ml/g support, about 1.0 ml/g support, about 1.5 ml/g support, or about any value disclosed herein.

The support may have an average particle size of from about 20 to 200 micrometers. The average particle size may range from a low of about 20, 30, 50, 70, or 80 to a high of about 80, 90, 100, 110, 130, or 200 micrometers, including any combination of any upper or lower value disclosed herein.

At least 20%, 25%, 30%, 35%, 40%, 45%, 50%, 60%, 70%, 80%, 85% or even more of the incremental pore volume in the support may be comprised of pores having a pore diameter larger than about 100, 125, or 150 Angstrom, and optionally smaller than about 1000, 900, 800 Angstrom, including any combination of numbers disclosed herein. Additionally, less than 20%, 15%, 10%, 5%, 2.5% or less of the incremental pore volume may be comprised of pores having a pore diameter in the range of about 1000 Angstrom or more, about 900 Angstrom or more, or about 800 Angstrom or more.

The support may comprise agglomerates of a plurality of primary particles, the support or agglomerates preferably having an average particle size of at least 50 μm, a surface area less than 1000 $m^2/g$ support, or a combination thereof. The agglomerates may be at least partially encapsulated. The agglomerates may typically have an overall size range of 1-300 μm (e.g., 30-200 μm), the primary particles a size range of 0.001-50 μm (e.g., 50-400 nm or 1-50 μm), and the elementary particles a size range of 1-400 nm (e.g., 5-40 nm). The agglomerates may be created through spray drying or another process. As used herein, "spray dried" refers to metal oxide such as silica obtained by expanding a sol in such a manner as to evaporate the liquid from the sol, e.g., by passing the silica sol through a jet or nozzle with a hot gas. Alternatively, the porous support does not comprise agglomerates.

The supports disclosed herein enable higher activator (e.g., aluminoxane) loadings than what has conventionally been possible with MCN catalyst compounds. For example, the aluminoxane loading on the porous silica support may be greater than about 9.0, 9.5, 10, 12, 14, or 18 mmol Al/g support. The aluminoxane loading may range from a low of about 9.0, 9.5, 10, 11, 12, 13, 14, 15, or 16 mmol Al/g support to a high of about 12, 14, 16, 18, or 20 mmol Al/g support, including any combination of any upper or lower value disclosed herein.

For purposes herein, the term "aluminoxane loading" is the amount of aluminoxane in the silica supported aluminoxane that is adhered to silica particles. The aluminoxane may be adhered within the outer or inner pores of the particles, adhered to the surface of the particles, or otherwise adhered to the particles. Aluminoxane loading may be represented as mmol Al/g silica.

Supportation: The support may be treated with an organometallic compound to react with deprotonated reactive sites on the support surface. In general the support is treated first with an organometallic activator such as MAO, and then the supported activator is treated with the MCN catalyst compound. Alternatively, the MCN catalyst compound could be loaded on the support first, followed by contact with the other catalyst system components.

The support, having reactive surface groups especially after calcining, may be slurried in a non-polar solvent and contacted with the organometallic compound (activator in this example), preferably dissolved in the solvent, preferably for a period of time in the range of from about 0.5 hours to about 24 hours, from about 2 hours to about 16 hours, or from about 4 hours to about 8 hours. Suitable non-polar solvents are materials in which, other than the support and its adducts, all of the reactants used herein, i.e., the activator, and the MCN catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

The supported activator may optionally be treated with another organometallic compound which is also selected as the scavenger, preferably a metal alkyl such as an aluminum alkyl, to scavenge any hydroxyl or other reactive species that may be exposed by or otherwise remaining after treatment with the first organometallic compound. Useful metal alkyls which may be used may have the general formula $R_n$-M, wherein R is $C_1$-$C_{40}$ hydrocarbyl such as $C_1$-$C_{12}$ alkyl, M is a metal, and n is equal to the valence of M, and may include oxophilic species such as diethyl zinc and aluminum alkyls, such as, for example, trimethylaluminum, triethylaluminum, triisobutylaluminum, tri-n-hexylaluminum, tri-n-octylaluminum and the like, including combinations thereof. The supported activator may also be generated in situ.

Activators: Activators are compounds used to activate any one of the catalyst precursor compounds described above by converting the neutral catalyst precursor compound to a catalytically active catalyst compound cation. Preferred activators include aluminoxane compounds, including modified aluminoxane compounds.

Aluminoxanes are generally oligomeric, partially hydrolyzed aluminum alkyl compounds containing —Al(R1)—O— sub-units, where R1 is an alkyl group, and may be produced by the hydrolysis of the respective trialkylaluminum compound. Examples of aluminoxane activators include methylaluminoxane (MAO), ethylaluminoxane, butylaluminoxane, isobutylaluminoxane, modified MAO (MMAO), halogenated MAO where the MAO may be halogenated before or after MAO supportation, dialkylaluminum cation enhanced MAO, surface bulky group modified MAO, and the like. MMAO may be produced by the hydrolysis of trimethylaluminum and a higher trialkylaluminum such as triisobutylaluminum. Mixtures of different aluminoxanes may also be used as the activator(s).

There are a variety of methods for preparing aluminoxanes suitable for use in the present invention, non-limiting examples of which are described in U.S. Pat. Nos. 4,665,208, 4,952,540, 5,041,584, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B 1-0 586 665, and PCT publications WO 94/10180 and WO 99/15534; halogenated MAO are described in U.S. Pat. Nos. 7,960,488; 7,355,058; and 8,354,485; dialkylaluminum cation enhanced MAO are described in US 2013/0345376; and surface bulky group modified supported MAO are described in U.S. Pat. No. 8,895,465, all of which are herein fully incorporated by reference.

Optional Scavengers or Co-Activators: In addition to the activator compounds, scavengers or co-activators may be used. Suitable co-activators may be selected from the group consisting of: trialkylaluminum, dialkylmagnesium, alkylmagnesium halide, and dialkylzinc. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and the like. Other oxophilic species, such as diethyl zinc may be used. As mentioned above, the organometallic compound used to treat the calcined support material may be a scavenger or co-activator, or may be the same as or different from the scavenger or co-activator. In an embodiment, the co-activator is selected from the group consisting of: trimethylaluminum, triethylaluminum, triisobutylaluminum, tri-n-octylaluminum, trihexylaluminum, and diethylzinc (alternately the group consisting of: trimethylaluminum, triethylaluminum, triisobutylaluminum, trihexylaluminum, tri-n-octylaluminum, dimethylmagnesium, diethylmagnesium, dipropylmagnesium, diisopropylmagnesium, dibutyl magnesium, diisobutylmagnesium, dihexylmagnesium, dioctylmagnesium, methylmagnesium chloride, ethylmagnesium chloride, propylmagnesium chloride, isopropylmagnesium chloride, butyl magnesium chloride, isobutylmagnesium chloride, hexylmagnesium chloride, octylmagnesium chloride, methylmagnesium fluoride, ethylmagnesium fluoride, propylmagnesium fluoride, isopropylmagnesium fluoride, butyl magnesium fluoride, isobutylmagnesium fluoride, hexylmagnesium fluoride, octylmagnesium fluoride, dimethylzinc, diethylzic, dipropylzinc, and dibutylzinc).

Chain Transfer Agents: One or more chain transfer agent ("CTA") may be used in the polymerization processes disclosed herein. The CTA can be any desirable chemical compound such as those disclosed in WO 2007/130306. Preferably, the CTA is selected from Group 2, 12, or 13 alkyl or aryl compounds; preferably zinc, magnesium or aluminum alkyls or aryls; preferably where the alkyl is a $C_1$ to $C_{30}$ alkyl, alternately a $C_2$ to $C_{20}$ alkyl, alternately a $C_3$ to $C_{12}$ alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; e.g., dialkyl zinc compounds, where the alkyl is selected independently from methyl, ethyl, propyl, butyl, isobutyl, tertbutyl, pentyl, hexyl, cyclohexyl, and phenyl, where diethylzinc is particularly preferred; or e.g., trialkyl aluminum compounds, where the alkyl is selected independently from methyl, ethyl, propyl, butyl, isobutyl, tertbutyl, pentyl, hexyl, cyclohexyl, and phenyl; or e.g., diethyl aluminum chloride, diisobutylaluminum hydride, diethylaluminum hydride, di-n-octylaluminum hydride, dibutylmagnesium, diethylmagnesium, dihexylmagnesium, and triethylboron.

Useful CTAs are typically present at from 10 or 20 or 50 or 100 equivalents to 600 or 700 or 800 or 1000 equivalents relative to the catalyst component. Alternately the CTA is preset at a catalyst complex-to-CTA molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; or/and alternatively 1:10 to 1:1.

Monomers: Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene, and isomers thereof. The monomer may comprise propylene with optional co-monomer(s) comprising one or more of ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. Additionally, the monomer may be propylene with no co-monomer is present.

Exemplary $C_2$ to $C_{40}$ olefin monomers and optional co-monomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

One or more dienes may be present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments, at least 50 ppm of diene is added to the polymerization, or 100 ppm or more, or 150 ppm or more.

Diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). The diolefin monomers may be selected from alpha, omega-diene monomers (i.e., di-vinyl monomers). The diolefin monomers may be linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10- undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

The polymerization or copolymerization may be carried out using olefins such as ethylene, propylene, 1-butene, 1-hexene, 4-methyl-l-pentene, and 1-octene, vinylcyclohexane, norbornene and norbornadiene. In particular, propylene and ethylene are polymerized.

Preferably, the co-monomer(s) are present in the final propylene polymer composition at less than 50 mol %, preferably from 0.5 to 45 mol %, preferably from 1 to 30 mol %, preferably from 3 to 25 mol %, preferably from 5 to 20 mol %, preferably from 7 to 15 mol %, with the balance of the copolymer being made up of the main monomer (e.g., propylene), based on the molecular.

Polymerization: Polymerization processes using the catalyst systems disclosed herein can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are useful. (A homogeneous polymerization process is defined to be a process where at least 90 wt % of the product is soluble in the reaction media.) A bulk homogeneous process is also useful. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-l-pentene, 4-methyl-l-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

Polymerizations can be run at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

Hydrogen may be present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa). Alternatively, hydrogen is not added to the polymerization reactor; hydrogen may be present from other sources, such as a hydrogen-generating catalyst, but none is added to the reactor.

The activity of the catalyst may be at least 50 g/mmol/hour, 500 g/mmol/hour or more, 5000 g/mmol/hr or more, 50,000 g/mmol/hr or more, 100,000 g/mmol/hr or more, 150,000 g/mmol/hr or more, 200,000 g/mmol/hr or more, 250,000 g/mmol/hr or more, 300,000 g/mmol/hr or more, or 350,000 g/mmol/hr or more.

Polymer Products: The processes described herein can produce a variety of polymer products, including but not limited to ethylene and propylene homopolymers and copolymers. The polymers produced may be homopolymers of ethylene or propylene or copolymers of ethylene preferably having from 0 to 25 mole % (alternately from 0.5 to 20 mole %, alternately from 1 to 15 mole %, preferably from 3 to 10 mole %) of one or more C3 to C20 olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 to 25 mole % (alternately from 0.5 to 20 mole %, alternately from 1 to 15 mole %, preferably from 3 to 10 mole %) of one or more of C2 or C4 to C20 olefin comonomer (preferably ethylene or C4 to C12 alpha-olefin, preferably ethylene, butene, hexene, octene, decene, dodecene, preferably ethylene, butene, hexene, octene).

The polymers may comprise polypropylene, for example, iPP, highly isotactic polypropylene, sPP, hPP, and RCP. The polypropylene polymer may also be heterophasic. The propylene polymer may also be an impact copolymer (ICP). The ICP comprises a blend of iPP, preferably with a $T_m$ of 120° C. (DSC, peak second melt) or more, with a propylene polymer with a glass transition temperature ($T_g$) of −30° C. or less and/or an ethylene polymer.

The polymers may comprise isotactic polypropylene having a melting temperature, Tm, DSC peak second melt, of at least 151° C., 152° C., or 153° C. or more. The polymers may also comprise isotactic polypropylene having a melt flow rate (MFR, ASTM D-1238, 2.16 kg and 230° C.) of less than about 0.4, 0.35, or 0.3 dg/min Additionally, the polymers may comprise isotactic polypropylene having a molecular weight, Mw, of at least 600, 1000, or 1400 kg/mol.

The polymers produced herein may be combined with one or more additional polymers prior to being formed into a film, molded part, or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™1010 or IRGANOX™1076 available from Ciba-Geigy); phosphites (e.g., IRGAFOS™168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Impact Copolymers: The polymers produced herein can be used in impact copolymers. The impact copolymer (ICP) can include a polypropylene polymer produced herein and another polymer such as an ethylene copolymer. The morphology is typically such that the matrix phase is primarily the polypropylene polymer and the dispersed phase can be primarily the ethylene copolymer phase.

The impact copolymer can have a total propylene content of at least 75 wt %, at least 80 wt %, at least 85 wt %, at least 90 wt %, or at least 95 wt %, based on the weight of the impact copolymer.

The impact copolymer can have a total comonomer content from about 1 wt % to about 35 wt %, about 2 wt % to about 30 wt %, about 3 wt % to about 25 wt %, or about 5 wt % to about 20 wt %, based on the total weight of the impact copolymer, with the balance being propylene.

Preferred impact copolymers comprise iPP and ethylene copolymer and typically have an ethylene copolymer (preferably ethylene propylene copolymer) content from a low of about 5 wt %, about 8 wt %, about 10 wt %, or about 15 wt % to a high of about 25 wt %, about 30 wt %, about 38 wt %, or about 42 wt %. For example, the impact polymer can have an ethylene copolymer content of about 5 wt % to about 40 wt %, about 6 wt % to about 35 wt %, about 7 wt % to about 30 wt %, or about 8 wt % to about 30 wt %.

In preferred impact copolymers comprising iPP and ethylene copolymer, the impact copolymer can have a propylene content of the ethylene copolymer component from a low of about 25 wt %, about 37 wt %, or about 46 wt % to a high of about 73 wt %, about 77 wt %, or about 80 wt %, based on the based on a weight of the ethylene copolymer. For example, the impact copolymer can have a propylene content of the ethylene copolymer component from about 25 wt % to about 80 wt %, about 10 wt % to about 75 wt %, about 35 wt % to about 70 wt %, or at least 40 wt % to about 80 wt %, based on the weight of the ethylene copolymer.

In preferred impact copolymers comprising iPP and ethylene copolymer, the impact copolymer can have ratio of the intrinsic viscosity (IV, ASTM D 1601 −135° C. in decalin) of the ethylene copolymer component to the intrinsic viscosity of the polypropylene component from a low of about 0.5, about 1.5, about 3, or about 4 to a high of about 6, about 9, about 12, or about 15. For example, the impact copolymer component can have a ratio of the intrinsic viscosity of about 0.5 to about 15, about 0.75 to about 12, or about 1 to about 7.

The impact copolymer can have a propylene meso diads content in the polypropylene component 90% or more, 92% or more, about 94% or more, or about 96% or more. Polypropylene microstructure is determined according to the $^{13}C$ NMR procedure described in US 2008/0045638 at paragraph [0613].

The impact copolymer can have a weight average molecular weight (Mw) from a low of about 20 kg/mol, about 50 kg/mol, about 75 kg/mol, about 150 kg/mol, or about 300 kg/mol to a high of about 600 kg/mol, about 900 kg/mol, about 1,300 kg/mol, or about 2,000 kg/mol. For example, the ethylene copolymer can have a Mw of about 50 kg/mol to about 3,000 kg/mol, about 100 kg/mol to about 2,000 kg/mol, or about 200 kg/mol to about 1,000 kg/mol.

The impact copolymer can have a melt flow rate (MFR) from about 1 dg/min to about 300 dg/min, about 5 dg/min to about 150 dg/min, or about 10 dg/min to about 100 dg/min, or about 20 dg/min to about 60 dg/min.

The impact copolymer can have a melting point (Tm, peak second melt) from at least 100° C. to about 175° C., about 105° C. to about 170° C., about 110° C. to about 165° C., or about 115° C. to about 155° C.

The impact copolymer can have a heat of fusion ($H_f$, DSC second heat) of 60 J/g or more, 70 J/g or more, 80 J/g or more, 90 J/g or more, about 95 J/g or more, or about 100 J/g or more.

The impact copolymer can have a 1% secant flexural modulus from about 300 MPa to about 3,000 MPa, about 500 MPa to about 2,500 MPa, about 700 MPa to about 2,000 MPa, or about 900 MPa to about 1,500 MPa, as measured according to ASTM D 790 (A, 1.3 mm/min).

The impact copolymer can have a notched Izod impact strength at 23° C. of about 2.5 KJ/m$^2$ or more, about 5 KJ/m$^2$ or more, about 7.5 KJ/m$^2$ or more, about 10 KJ/m$^2$ or more, about 15 KJ/m$^2$ or more, about 20 KJ/m$^2$ or more, about 25 KJ/m$^2$ or more, or about 50 KJ/m$^2$ or more, as measured according to ASTM D 256 (Method A), optionally to a high of about 30 KJ/m$^2$, about 35 KJ/m$^2$, about 45 KJ/m$^2$, about 55 KJ/m$^2$, or about 65 KJ/m$^2$.

The impact copolymer can have a Gardner impact strength at −30° C. from about 2 KJ/m$^2$ to about 100 KJ/m$^2$, about 3 KJ/m$^2$ to about 80 KJ/m$^2$, or about 4 KJ/m$^2$ to about 60 KJ/m$^2$, as measured according to ASTM D 5420 (GC).

The impact copolymer can have a heat deflection temperature (HDT) of about 80° C. or more, about 85° C. or more, about 90° C. or more, or about 95° C. or more, as measured according to ASTM D 648 (0.45 MPa).

EXPERIMENTAL

Melt Flow Rate (MFR) was determined in accordance with ASTM D-1238 Condition L under a load of 2.16 kg and at a temperature of 230° C.

Mw, Mn, and MWD (Mw/Mn) were determined using a High Temperature Gel Permeation Chromatograph (Polymer Laboratories), equipped with a differential refractive index detector (DRI). Three Polymer Laboratories PLgel 10 μm Mixed-B columns are used. The nominal flow rate is 1.0 ml/min, and the nominal injection volume is 300 μL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/ml, with lower concentrations being used for higher molecular weight samples. Prior to running each sample, the DRI detector is purged. Flow rate in the apparatus is then increased to 1.0 ml/minute, and the DRI is allowed to stabilize for 8 hours before injecting the first sample. The molecular weight is determined by combining the universal calibration relationship with the column calibration which is performed with a series of monodispersed polystyrene (PS) standards. The MW is calculated at each elution volume with following equation:

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for polystyrene. In this method, $a_{PS}=0.67$ and $K_{PS}=0.000175$ while $a_X$ and $K_X$ are obtained from published literature. Specifically, a and K=0.695 and 0.000579 for ethylene polymer and 0.705 and 0.0002288 for propylene polymer. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. Specifically, dn/dc=0.109 for both propylene polymer and ethylene polymer. The mass recovery is calculated from the ratio of the integrated area of the concentration chromatography over elution volume and the injection mass, which is equal to the pre-determined concentration multiplied by injection loop volume. All molecular weights are reported in g/mol unless otherwise noted. In the event of conflict between the GPC-DRI procedure and the "Rapid GPC," the GPC-DRI procedure immediately above shall be used. Further details regarding methods of determining Mw, Mn, MWD are described in US 2006/0173123 pages 24-25, paragraphs [0334] to [0341].

Melting Temperature, $T_m$, was measured by differential scanning calorimetry ("DSC") using a DSC Q200 unit (TA Instruments). The sample is first equilibrated at 25° C. and subsequently heated to 220° C. using a heating rate of 10° C./min (first heat). The sample is held at 220° C. for 3 min. The sample is subsequently cooled down to −100° C. with a constant cooling rate of 10° C./min (first cool). The sample is equilibrated at −100° C. before being heated to 220° C. at a constant heating rate of 10° C./min (second heat). The exothermic peak of crystallization (first cool) is analyzed using the TA Universal Analysis software and the corresponding to 10° C./min cooling rate is determined. The endothermic peak of melting (second heat) is also analyzed using the TA Universal Analysis software and the peak melting temperature ($T_m$) corresponding to 10° C./min heating rate is determined.

1% Secant Flexural Modulus was measured using an ISO 37-Type 3 bar, with a crosshead speed of 1.0 mm/min and a support span of 30.0 mm using an Instron machine according to ASTM D 790 (A, 1.0 mm/min).

Catalyst Synthesis: The following supported catalysts were used in the examples. The chemical formulas for the MCN catalyst compounds are provided in Table 1 below. Procedures for synthesizing the catalyst compounds are also provided below.

Catalyst A: MCN1 supported on PD14024.

Catalyst B: MCN1 supported on D70-120A.

Catalyst C: MCN2 supported on PD14024.

Catalyst D (Comparative): MCN3 supported on PD14024.

Catalyst E (Comparative): MCN4 supported on PD14024.

Catalyst F (Comparative): MCN5 supported on PD14024.

Catalyst G: MCN8 supported on PD14024.

Catalyst H (Comparative): MCN6 supported on Davison 948 silica.

Catalyst I (Comparative): MCN7 supported on Davison 948 silica.

TABLE 1

MCN Catalyst Compounds

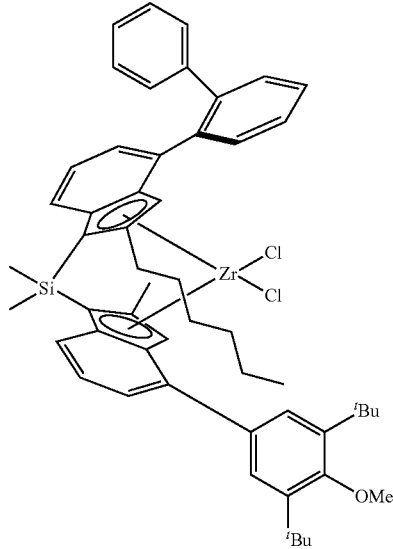

MCN1

TABLE 1-continued
MCN Catalyst Compounds
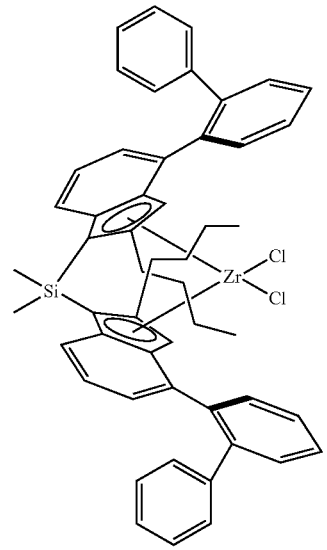
MCN2
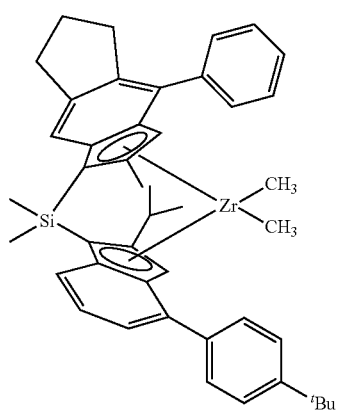
MCN3
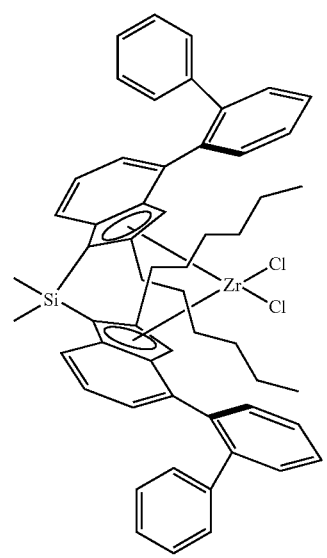
MCN4
TABLE 1-continued
MCN Catalyst Compounds
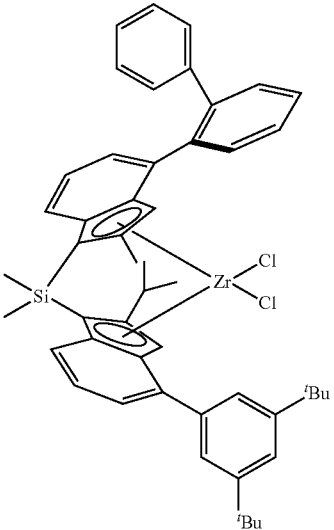
MCN5
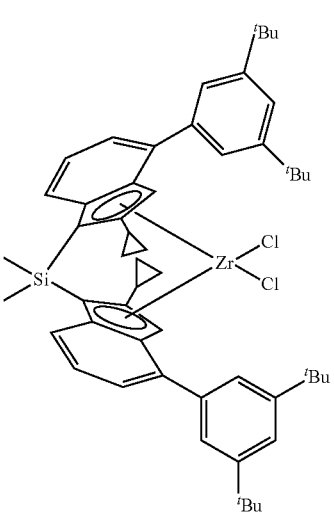
MCN6
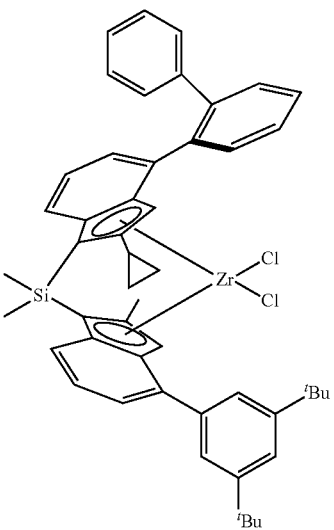
MCN7

TABLE 1-continued

MCN Catalyst Compounds

MCN8

[Structure of MCN8 catalyst: a dimethylsilyl-bridged bis-indenyl zirconium dichloride complex with one indenyl bearing a biphenyl substituent and the other bearing a 3,5-di-tert-butyl-4-methoxyphenyl substituent]

MCN1 Synthesis:

4-([1,1'-Biphenyl]-2-yl)-2-n-Hex-1H-indene: Two procedures are provided for this synthesis, either being suitable. Procedure 1: A solution of compound 4-([1,1'-Biphenyl]-2-yl)-2-bromo-1H-indene (15 g, 43.2 mmol, 1 equiv.) and anhydrous toluene (150 mL) was treated with bis(triphenylphosphine)palladium(II)-dichloride (3.5 g, 4.3 mmol, 0.1 equiv.). After stirring for 10 minutes, 2 M hexylmagnesium bromide in diethyl ether (112 mL, 224.6 mmol, 5.2 equiv.) was added dropwise. The reaction was heated at 60° C. for 5 hours. The reaction was cooled with an ice bath, acidified with 1NHCl to pH 3 and extracted with ethyl acetate (3×500 mL). The combined organic layers were washed with saturated brine (800 mL), dried over sodium sulfate, and concentrated under reduced pressure. The residue was purified over silica gel (200 g) eluting with heptanes to give the product (7 g, 46% yield) as a light yellow oil. Procedure 2: In a glove box, n-hexylmagnesium bromide (34.7 mL, 2.0 M in diethyl ether, 69.4 mmol) was added to a solution of 4-([1,1'-Biphenyl]-2-yl)-2-bromo-1H-indene (20.0 g, 57.8 mmol) and PdCl (dppf).DCM (2.30 g, 2.89 mmol) in 100 mL of THF. The reaction was heated up to 40° C. and stirred at this temperature for 10 hours. The reaction was cooled down to RT and the solvent was evaporated. The residue was moved out the glove box and quenched with 200 mL of water and the mixture was extracted with hexane (100 mL×2). The combined organic phases were dried over MgSO$_4$ and concentrated in vacuo. The residue was purified by silica gel chromatography (eluent: hexane) to get product as colorless oil (19.52 g).

Lithium {1-[4-(3',5'-di-tert-4'-methoxybutylphenyl)-2-methyl indenide]}: A precooled solution of 4-(3',5'-di-tert-butyl-4'-methoxyphenyl)-2-methyl-indene (15.0 g, 43.1 mmol) in diethyl ether (200 mL) was treated with $^n$BuLi (2.5 M in hexane, 18.1 mL, 45.3 mmol). The reaction was stirred at RT for 15 hours. Then all volatiles were evaporated. The residue was washed with pentane (10 mL) and dried under vacuum to yield a white solid (15.15 g).

Chlorodimethyl [4-(3',5'-di-tert-butyl-4 '-methoxyphenyl)-2-methyl-indenyl] silane: A precooled solution of lithium 1-[4-(3',5'-di-tert-4'-methoxybutylphenyl)-2-methyl indenyl] (15.1 g, 42.8 mmol) in diethyl ether (100 mL) was treated with Me$_2$SiCl$_2$ (27.4 g, 214.0 mmol), and the white slurry was stirred at RT for 5 hours. All volatiles were evaporated under reduced pressure. The residue was extracted with hexane (100 mL×2), and the combined filtrate was concentrated to dryness under vacuum to give white foam (18.36 g).

Dimethylsilyl [4-(3',5'-di-tert-butyl-4'-methoxyphenyl)-2-methyl-indenyl] trifluoromethane-sulfonate: A solution of chlorodimethyl[4-(3',5'-di-tert-butyl-4'-methoxyphenyl)-2-methyl-indenyl]silane (18.34 g, 41.7 mmol) in toluene (100 mL) was treated with silver trifluoromethanesulfonate (11.2 g, 43.8 mmol) while stirring. The white slurry was stirred at RT for 5 hours. Toluene was removed under vacuum and the residue was extracted with hexane (100 mL×2). The collected filtrate was concentrated under vacuum to give colorless foam as the product (22.82 g).

Lithium [1-(4-o-Biphenyl)-2-hexyl-indenide]: A precooled solution of 4-([1,1'-Biphenyl]-2-yl)-2-n-Hex-1H-indene (15.0 g, 42.6 mmol) in diethyl ether (100 mL) was treated with $^n$BuLi (2.5 M in hexane, 17.9 mL, 44.7 mmol). The reaction was stirred at RT for 3 hours. Then all volatiles were evaporated. The residue was washed with hexane (20 mL×2) and dried under vacuum to yield a white solid as the product (14.21 g).

(4-o-Biphenyl-2-hexyl-indenyl) (4-(3',5'-di-tert-butyl-4'-methoxyphenyl)-2-methyl-indenyl) dimethylsilane: A precooled solution of dimethylsilyl[4-(3',5'-di-tert-butyl-4'-methoxyphenyl)-2-methyl-indenyl] trifluoromethanesulfonate (22.73 g, 39.2 mmol) in diethyl ether (100 mL) was treated with lithium [1-(4-o-biphenyl-2-hexyl indenide)] (14.03 g, 39.2 mmol). The solution was stirred at RT overnight. Diethyl ether was evaporated. The residue was purified by flash chromatography (silica gel, eluent: hexane) to give a pale yellow oil (13.24 g).

Dilithium dimethylsilyl (4-o-biphenyl-2-hexyl indenide) (4-(3',5'-di-tert-butyl-4'-methoxyphenyl)-2-methyl indenide): $^n$BuLi (2.5 M, 14.3 mL, 35.79 mmol) was added to a precooled solution of the above product (13.20 g, 17.46 mmol) in diethyl ether (100 mL). The solution was stirred at RT for 3 hours. All volatiles were removed under vacuum. The residue was washed with pentane (15 mL×2) and dried under vacuum to give the dilithium compound (12.11 g).

Dimethylsilyl (4-o-biphenyl-2-hexyl indenyl) (4-(3',5'-di-tert-butyl-4'-methoxyphenyl)-2-methyl indenyl) zirconium dichloride: A precooled solution of dilithium dimethylsilyl (4-o-biphenyl-2-cyclopropyl indenide) (4-(3',5'-di-tert-butylphenyl)-2-methyl indenide (12.06 g, 15.7 mmol) in toluene (100 mL) was treated with ZrCl$_4$ (3.79 g, 1.17 mmol). The mixture was stirred at RT overnight. The mixture was filtered through Celite to get rid of LiCl and evaporated to dryness. The residue was washed with hexane (50 mL) to get a solid as a mixture of two isomers. The mixture was recrystallized toluene (20 mL, 100° C. to 40° C.) to get the corresponding meso-isomer metallocene (361 mg, ratio of rac/meso=1:22). The combined filtrate was concentrated and recrystallized (10 mL of toluene and 5 mL of hexane, refluxed to room temperature) to afford mixture with rac/meso=15:1. The mixture was further recrystallized (10 mL of toluene and 6 mL of hexane, refluxed to room temperature) to obtain the rac-isomer (623 mg, ratio of rac/meso=22: 1). $^1$H NMR (400 MHz, C$_6$D$_6$, 23° C.), rac- form isomer: δ 8.26 (dd, 1H), 7.91 (s, 2H), 7.51 (d, 1H), 7.43 (dd, 1H), 7.36-7.32 (m, 1H), 7.29 (d, 1H)), 7.25 (td, 1H), 7.18-7.09 (m, 5H), 6.95-6.83 (m, 5H), 6.69 (dd, 1H), 3.41 (s, 3H), 2.76-2.66 (m, 1H), 2.48-2.38 (m, 1H), 1.96 (s, 3H), 1.57 (s, 18H), 1.47-1.13 (m, 8H), 0.93-0.87 (m, 6H), 0.65 (s, 3H); meso- form isomer: $^1$H NMR (400 MHz, C$_6$D$_6$, 23° C.) δ

8.22-8.18 (m, 1H), 7.90 (s, 2H), 7.38 (dd, 2H), 7.31-7.28 (m, 2 H), 7.19-7.09 (m, 2H), 7.05-7.71 (m, 3H), 6.96-6.78 (m, 4H), 6.75 (dd, 1H), 6.67 (s, 1H), 6.58 (dd, 1H), 3.39 (s, 3H), 2.81-2.71 (m, 1H), 2.66-2.56 (m, 1H), 2.18 (s, 3H), 1.54 (s, 18 H), 1.40-1.12 (m, 8H), 0.91 (t, 3H), 0.81 (s, 3H), 0.76 (s, 3H).

MCN2 Synthesis:

4-([1,1'-Biphenyl]-2-yl)-2-n-Butyl-1H-indene: In glove box, n-butylmagnesium chloride (18.06 mL, 2.0 M in THF, 36.1 mmol) was added to a solution of 4-(biphenyl-2-yl)-2-bromo-indene (10.0 g, 28.9 mmol) and PdCl$_2$(dppf).DCM (0.704 g, 0.867 mmol) in 100 mL of THF. The reaction was heated up to 40° C. and stirred at this temperature for 10 hours. The reaction was moved out the glove box and quenched with 200 mL of water. The mixture was extracted with toluene (100 mL×2). The combined organic phases were dried over Na$_2$SO$_4$ and concentrated under reduced pressure. The residue was purified by silica gel chromatography (eluent: hexane) to get the product as a colorless oil (7.82 g).

Lithium [1-(4-o-biphenyl)-2-butyl-indenide]: A precooled solution of 4-o-biphenyl-2-butyl-indene (7.80 g, 24.1 mmol) in diethyl ether (50 mL) was treated with "BuLi (2.5 M in hexane, 10.1 mL, 25.3 mmol). The reaction was stirred at RT for 3 hours. Then all volatiles were evaporated. The residue was washed with hexane (10 mL×2) and dried under vacuum to yield an off-white solid as the product (7.09 g).

Chlorodimethyl [(4-o-biphenyl)-2-butyl-indenyl] silane: A precooled solution of lithium [1-(4-o-biphenyl)-2-butyl-indenide] (3.30 g, 10.0 mmol) in diethyl ether (50 mL) was treated with Me$_2$SiCl$_2$ (6.50 g, 50.0 mmol), and the resulting white slurry was stirred at RT overnight. All volatiles were evaporated under reduced pressure. The residue was extracted with hexane (30 mL×2), and the combined filtrate was concentrated to dryness under vacuum to give colorless oil (2.94 g).

Dimethylsilyl (4-o-biphenyl-2-butyl-indenyl) trifluoromethanesulfonate: A solution of chlorodimethyl (4-o-biphenyl-2-butyl-indenyl) silane (2.90 g, 6.97 mmol) in toluene (30 mL) was treated with silver trifluoromethanesulfonate (1.96 g, 7.67 mmol) while stirring. The white slurry was stirred at RT for 5 hours. Toluene was evaporated under vacuum and the residue was extracted with hexane (30 mL×2). The filtrate was concentrated under vacuum to give colorless oil as the product (3.60 g).

Bis(4-o-biphenyl-2-butyl-indenyl) dimethylsilane: A precooled solution of dimethylsilyl (4-o-biphenyl-2-butyl-indenyl) trifluoromethanesulfonate (3.50 g, 6.60 mmol) in diethyl ether (30 mL) was treated with lithium [1-(4-o-biphenyl)-2-butyl-indenide] (2.18 g, 6.60 mmol). The solution was stirred for 3 hours at room temperature. Diethyl ether was evaporated. The residue was extracted with solvents (mixed with 30 mL of toluene and 30 mL of hexane). The combined filtrate was concentrated and further dried over vacuum to get an off-white solid as the product (3.24 g).

Dilithium dimethylsilyl bis(4-o-biphenyl-2-butyl-indenide): "BuLi (2.5 M, 3.7 mL, 9.26 mmol) was added to a precooled solution of bis(4-o-biphenyl-2-butyl-indenyl) dimethylsilane (3.18 g, 4.52 mmol) in diethyl ether (30 mL). The solution was stirred at RT for 3 hours. All volatiles were removed under vacuum. The residue was washed with hexane (10 mL×2) and dried under vacuum to give pale yellow foam (2.45 g).

Dimethylsilyl bis(4-o-biphenyl-2-butyl-indenyl) zirconium dichloride: A precooled solution of dilithium dimethylsilyl bis(4-o-biphenyl-2-butyl-indenide) (2.37 g, 3.31 mmol) in toluene (30 mL) was treated with ZrCl$_4$ (0.76 g, 3.31 mmol). The mixture was stirred at RT overnight. The mixture was then evaporated to dryness. The residue was extracted with hot cyclohexane (50 mL). The combined filtrate was concentrated under reduced pressure and washed with hexane (20 mL) to get an orange solid as a mixture of two isomers. The mixture was recrystallized (2 mL of toluene and 18 mL hexane, refluxed to room temperature) to afford mixture (520 mg, wet, ratio of rac/meso=10:1). Then the mixture was further recrystallized (1.5 mL of toluene and 13.5 mL hexane, refluxed to room temperature) to afford the rac-isomer (100 mg, ratio of rac/meso=68:1). $^1$H NMR (400 MHz, C$_6$D$_6$, 23° C.), rac- form isomer: δ 8.26-8.23 (m, 2H), 7.38 (d, 2H), 7.35-7.30 (m, 2H), 7.22-7.12 (m, 4H), 7.10-7.05 (m, 6H), 6.90-6.78 (m, 8H), 6.70 (dd, 2H), 2.66-2.55 (m, 2H), 2.41-2.30 (m, 2H), 1.29-1.19 (m, 4H), 1.13-1.02 (m, 4H), 0.81 (t, 6H), 0.75 (s, 6H).

MCN3 Synthesis:

MCN3 was synthesized as provided in Organometallics, 2011, 30 (21), pages 5744-5752.

MCN4 Synthesis:

Lithium {1-[(4-o-biphenyl-2-"hexyl) indenide]}: "BuLi (2.5 M, 8.2 mL, 20.5 mmol) was added to a stirring precooled solution of 4-([1,1'-Biphenyl]-2-yl)-2-"Hex-1H-indene (6.55 g, 18.58 mmol) in diethyl ether (100 mL). The solution was stirred at RT for 19 hours. All volatiles were evaporated. The residue was dried under vacuum to give a crude product containing 0.08 equiv. of Et$_2$O (6.07 g). The product was used without further purification.

Chlorodimethyl[4-o-biphenyl-2-"hexyl-indenyl]silane: Me$_2$SiCl$_2$ (10 g, 77.48 mmol) was added to a precooled solution of above lithium salts (1.97 g, 5.40 mmol) in diethyl ether (60 mL). Additional diethyl ether (10 mL) was added. The white slurry was stirred at RT for 17 hours. All volatiles were removed in vacuo. The residue was extracted with hexane (50 mL once, 10 mL once) and the filtrate was concentrated under vacuum to give the product (2.19 g). The product was used without further purification.

Dimethylsilyl[4-o-biphenyl-2-"hexyl-indenyl] trifluoromethanesulfonate: Silver trifluoromethanesulfonate (1.31 g, 5.098 mmol) was added to a stirring solution of above product (2.16 g, 4.853 mmol) in toluene (25 mL). Additional toluene (10 mL) was added. The slurry was stirred at RT for 1 hour. Toluene was removed under vacuum and the residue was extracted with hexane (40 mL once, 10 mL once). The hexane filtrate was concentrated under vacuum to give the product (2.55 g). The product was used without further purification.

Bis(4-o-Biphenyl-2-"hexyl-indenyl) dimethylsilane: Lithium {1-[1-[(4-o-biphenyl-2-"hexyl) indenide]} (Et$_2$O)$_{0.08}$ (1.62 g, 4.446 mmol) was added to a precooled solution of dimethylsilyl[4-o-biphenyl-2-"hexyl-indenyl] trifluoromethanesulfonate (2.48 g, 4.439 mmol) in diethyl ether (40 mL). Additional diethyl ether (10 mL) was added. The reaction was stirred at RT for 19 hours. All volatiles were evaporated. The residue was extracted with hexane (50 mL once, 10 mL once) and the filtrate was concentrated under vacuum to give the crude product (3.28 g). The product was used without further purification.

Dilithium dimethylsilyl bis(4-o-biphenyl-2-"hexyl-indenide): "BuLi (2.5 M, 3.5 mL, 8.75 mmol) was added to a precooled solution of the above crude product (3.22 g) in diethyl ether (30 mL) and hexane (15 mL). The solution was stirred at RT for 24 hours. All volatiles were removed under vacuum. The residue was washed with hexane (20 mL twice) and dried under vacuum to give the crude product containing 0.54 equiv. of Et$_2$O (3.29 g).

Dimethylsilyl bis(4-o-Biphenyl-2-"hexyl-indenyl) zirconium dichloride: $ZrCl_4$ (0.96 g, 4.119 mmol) was added to a precooled solution of the above crude product (3.27 g) in toluene (40 mL). Additional toluene (10 mL) was added. The mixture was stirred at RT for 18 hours. All volatiles were removed under vacuum. The residue was extracted with hexane (60 mL once, 10 mL once). The hexane insolubles were then extracted into toluene (40 mL once, 10 mL once). Toluene filtrates were concentrated to dryness under vacuum to give crude product as a rac/meso mixture in 1/1.2 ratio (1.15 g). Toluene (4 mL) and hexane (32 mL) were added. The slurry was heated to reflux and then was cooled back to room temperature. The mixture was stirred at RT for 3 days. The precipitates were separated, washed with hexane (5 mL twice), and dried in vacuo to give a solid with rac/meso ratio of 1/1.6 (0.99 g). Further multiple fractional crystallizations from diethyl ether afforded a crude product (0.28 g) with rac/meso ratio of about 50/1 plus some insoluble impurities. To this crude product was added $CH_2Cl_2$ (18 mL). The mixture was filtered and the insolubles were washed with additional $CH_2Cl_2$ (18 mL once, 5 mL once). The filtrate and washings were combined and evaporated to dryness. The solid obtained was washed with diethyl ether (5 mL) and dried in vacuo to afford the product (0.15 g, rac/meso=40/1). $^1H$ NMR (400 MHz, $CD_2Cl_2$, 23° C.): rac: δ 7.64 (m, 2H), 7.49 (m, 2H), 7.40-7.46 (m, 6H), 7.11 (m, 2H), 7.04-7.08 (m, 10H), 6.91 (m, 2H), 6.32 (s, 2H), 2.54 (m, 2H), 2.10 (m, 2H), 1.32-1.08 (m, 22H), 0.88 (t, 6H).

MCN5 Synthesis: MCN5 was synthesized as described in US Patent Publication 2015/0025208.

MCN6 and MCN7 Synthesis: MCN6 and MCN7 were synthesized as described in U.S. Pat. No. 9,279,024.

MCN8 Synthesis:

Chlorodimethyl (4-o-biphenyl-2-butyl-inden-1-yl) silane: A precooled solution of lithium [1-(4-o-biphenyl)-2-butyl-indenide] (3.30 g, 10.0 mmol) in diethyl ether (50 mL) was treated with $Me_2SiCl_2$ (6.45 g, 50.0 mmol), and the resulting white slurry was stirred over night at room temperature. All volatiles were evaporated. The residue was extracted with hexane (20 mL×2), and the combined filtrate was concentrated under reduced pressure to get colorless oil (3.91 g).

Dimethylsilyl (4-o-biphenyl-2-butyl-inden-1-yl) trifluoromethanesulfonate: A precooled solution of chlorodimethyl (4-o-biphenyl-2-butyl-inden-1-yl) silane (3.90 g, 9.4 mmol) in toluene (30 mL) was treated with silver trifluoromethanesulfonate (2.64 g, 10.3 mmol) while stirring. The white slurry was stirred for 3 hours at room temperature. Toluene was removed under reduced pressure, and the residue was extracted with hexane (20 mL×2). The collected filtrate was concentrated under reduced pressure to colorless oil as the product (4.88 g).

4,4,5,5-Tetramethyl-2-(6-methyl-1,2,3,7-tetrahydro-s-indacen-4-yl)-1,3,2-dioxaborolane: A mixture of 8-bromo-6-methyl-1,2,3,5-tetrahydro-s-indacene (24.8 g, 100 mmol), bis(pinacolato)diboron (25.4 g, 100 mmol), powdered anhydrous potassium acetate (19.6 g, 200 mmol), bis(triphenylphosphine)palladium(II) dichloride (3.50 g, 5.0 mmol), and DMF (100 mL) was refluxed under $N_2$ for 10 hours. The mixture was poured into 800 mL of water and extracted with toluene (2×100 mL). The combined organic phases were dried over $MgSO_4$ and concentrated in vacuo. The residue was purified by silica gel chromatography (eluent: hexane) to yield product as a white solid (24.30 g).

8-(3',5'-Di-tert-butyl-4'-methoxyphenyl)-6-methyl-1,2,3,5-tetrahydro-s-indacene: A mixture of 5-bromo-1,3-di-tert-butyl-2-methoxybenzene (7.07 g, 23.65 mmol), 4,4,5,5-Tetramethyl-2-(6-methyl-1,2,3,7-tetrahydro-s-indacen-4-yl)-1,3,2-dioxaborolane (7.00 g, 23.65 mmol), potassium carbonate (4.90 g, 35.5 mmol), tetrabutylammonium bromide (1.57 g, 4.73 mmol), bis(triphenylphosphine)palladium(II) dichloride (0.50 g, 0.71 mmol), water (100 mL) and ethanol (10 mL) was refluxed for 5 hours. The reaction was cooled down and extracted with hexane (2×200 mL). The combined organic layers were washed with water (100 mL), dried over $MgSO_4$, and concentrated under reduced pressure. The resulting residue was purified by silica gel column (eluent: hexane) to obtain product as a white solid (8.39 g).

Lithium {4-(3',5'-di-tert-butyl-4'-methoxyphenyl)-2-methyl-1,5,6,7-tetrahydro-s-indacenide}: A precooled solution of 8-(3',5'-di-tert-butyl-4'-methoxyphenyl)-6-methyl-1,2,3,5-tetrahydro-s-indacene (3.88 g, 10.0 mmol) in diethyl ether (20 mL) was treated with "BuLi (2.5 M in hexane, 4.2 mL, 10.5 mmol). The reaction was stirred over night at room temperature. Then all volatiles were evaporated. The residue was washed with hexane (20 mL×2) and dried under vacuum to yield an orange solid (3.60 g).

(4-o-Biphenyl-2-butyl-indenyl) (4-(3',5'-di-tert-butyl-4'-methoxyphenyl)-2-methyl-1,5,6,7-tetrahydro-s-indacenyl) dimethylsilane: A precooled solution of dimethylsilyl (4-o-biphenyl-2-butyl-inden-1-yl) trifluoromethanesulfonate (4.80 g, 9.06 mmol) in diethyl ether (30 mL) was treated with a solid of lithium 1-[4-(3',5'-di-tert-butyl-4'-methoxyphenyl)-2-methyl-1,5,6,7-tetrahydro-s-indacenide] (3.57 g, 9.06 mmol). The solution was stirred overnight at room temperature. Diethyl ether was evaporated. The residue was extracted with hexane (30 mL×2). The combined filtrate was concentrated to dryness and dried over vacuum to get colorless foam (6.70 g).

Dilithium dimethylsilyl (4-o-biphenyl-2-butyl indenide) (4-(3',5'-di-tert-butyl-4'-methoxyphenyl)-2-methyl-1,5,6,7-tetrahydro-s-indacenide): "BuLi (2.5 M, 7.1 mL, 17.83 mmol) was added to a precooled solution of (4-o-biphenyl-2-butyl-indenyl)(4-(3',5'-di-tert-butyl-4'-methoxyphenyl)-2-methyl-1,5,6,7-tetrahydro-s-indacenyl) dimethylsilane (6.68 g, 8.70 mmol) in diethyl ether (50 mL). The mixture was stirred for 3 hours at room temperature. All volatiles were removed under reduced pressure. The residue was washed with cool hexane (30 mL) and dried under vacuum to yield an orange solid (6.247 g).

Dimethylsilyl (4-o-biphenyl-2-butyl indenyl) (4-(3',5'-di-tert-butyl-4'-methoxyphenyl)-2-methyl-1,5,6,7-tetrahydro-s-indacenyl) zirconium dichloride: A precooled solution of dilithium dimethylsilyl (4-o-biphenyl-2-butyl indenide) (4-(3',5'-di-tert-butyl-4'-methoxyphenyl)-2-methyl-1,5,6,7-tetrahydro-s-indacenide) (6.20 g, 7.95 mmol) in toluene (50 mL) was treated with a powder of $ZrCl_4$ (1.83 g, 7.95 mmol). The mixture was stirred for 5 hours at room temperature. Then the mixture was concentrated under reduced pressure, and the residue was extracted with solvents (mixed with 25 mL of toluene and 20 mL of hexane). The combined filtrate was concentrated. The resulting residue was recrystallized (10 mL of toluene and 50 mL of hexane, refluxed to room temperature). Then the collected solid was further recrystallized (30 mL of toluene, refluxed to room temperature) to get the meso-isomer (853 mg, ratio of rac/meso<1:100). The filtrate from the first recrystallization was concentrated and the residue was recrystallized (10 mL of toluene and 50 mL of hexane, refluxed to room temperature) to afford rac-isomer (351 mg, ratio of rac/meso=39:1). $^1H$ NMR (400 MHz, $C_6D_6$, 23° C.), meso-form isomer: δ 8.23-8.17 (m, 1H), 7.83 (bs, 2H), 7.52 (d, 1H), 7.38 (s, 1H), 7.32-7.28 (m, 1H), 7.22-7.03 (m, 4H), 6.97 (dd, 1H), 6.88-6.77 (m, 4H), 6.63-6.57 (m, 2H), 3.45 (s, 3H), 3.08-2.55 (m, 6H), 2.16 (s, 3H), 1.85-1.65 (m, 2H), 1.55 (s, 18H), 1.45-1.16 (m, 2H), 1.16-1.08 (m, 2H), 0.91 (s, 3H), 0.85 (t, 3H), 0.76 (s, 3H); rac-form isomer: δ 8.28 (dd, 1H), 7.84 (bs, 2H), 7.46 (s, 1H), 7.37-7.23 (m, 3H), 7.19-7.08 (m, 4H), 6.97 (s, 1H), 6.94-6.83 (m, 4H), 6.68 (dd,1H), 3.47 (s, 3H), 3.12-3.02 (m, 1H), 2.98-2.72 (m, 4H), 2.50-2.40 (m, 1H), 1.95 (s, 3H), 1.84-1.72 (m, 2H), 1.59 (s, 18H), 1.38-1.10 (m, 4H), 0.94 (s, 3H), 0.87 (t, 3H), 0.69 (s, 3H).

Supportation: Silica was obtained from the Asahi Glass Co., Ltd. or AGC Chemicals Americas, Inc. (D170-120A), PQ Corporation (PD 14024), and Davison Chemical Division of W.R. Grace and Company (Davison 948).

Raw silica was calcined at the desired temperature (Tc, Table 2 below) using a tube furnace. Silica was poured into quartz tube which had $N_2$ flowing through the bottom to remove water vapor and also keep the silica in an inert atmosphere. Temperature and time requirements were fed into the tube furnace controller. Silica was calcined for about 8 hours to allow proper removal of water/moisture. Carbolite Tube Furnace Model VST 12/600 was used as the heating device, and the temperature was controlled by a Eurotherm 3216P1 temperature controller.

The quartz tube was filled with desired amount of silica (Ms, Table 2) and the $N_2$ valve was turned on. The nitrogen pressure was adjusted so that the silica was fluidized completely. The quartz tube was then placed inside the heating zone of the furnace. The temperature controller was used to control the heating and cooling manually. Its program contains up to 8 ramps and 8 dwelling segments. Silica was heated slowly to desired temp and then hold temp for at least 8 hours to allow complete calcination. After the dehydration was complete, the quartz tube was cooled down to RT. Calcined silica was collected in a silica catcher and brought inside the dry box where it was collected into a glass container. Diffuse Reflectance Infrared Fourier Transform Spectroscopy (DRIFTS) was done on calcined silica to quality control the calcination. Additional properties of the calcined silica are shown in Table 2 below.

TABLE 2

Silica Data and Calcination Conditions

| Silica# | Tc (° C.) | Ms (g) | Time (hr) | PS (μm) | SA (m²/g) | PV (mL/g) | PD (Å) |
|---|---|---|---|---|---|---|---|
| 1 PQ PD-14024 | 200 | 100 | 8 | 85 | 611 | 1.40 | 92 |
| 2 AGC D70-120A | 600 | 100 | 8 | 70 | 450 | 1.64 | 146 |

Supported MAO (sMAO) Preparation: MAO was obtained as a 30 wt % MAO in toluene solution from Albemarle (13.5 wt % Al or 5.0 mmol/g). In a 125 mL Celstir reactor, silica (amount in Table 3) was weighted and slurried into 6× toluene (e.g., 1 g silica, 6 g toluene). Silica slurry was stirred at 500 rpm to get a homogeneous mixture. MAO (30% toluene solution, amount in Table 3) was added very slowly into the silica slurry to maintain the temperature <40° C. After the completion of addition, the mixture was stirred for 30 minutes at RT and 350 rpm, and then heated at 100° C. for 3 hours. The slurry was cooled to RT and filtered through a medium frit. The filtrate mixed with THF-$d_8$ was analyzed with $^1$H NMR spectroscopy and no significant MAO was detected. The wet solid was washed once with 10× silica mass of toluene to remove possible unreacted MAO, then washed twice with 10× silica mass of hexane [e.g., if silica is 2 g, the solvent for each wash is 10×2=20 g], and then dried under vacuum for 3 hrs, yielding dry sMAO (yield in Table 3).

TABLE 3

Supported MAO Preparation Conditions

| sMAO# | Silica | Silica Mass (g) | Amount of 30% MAO (g) | MAO Load[a] (mmol/g SiO$_2$) | Yield (g) |
|---|---|---|---|---|---|
| 1 | PD14024 | 10.0 | 26.43 | 13 | 17.85 |
| 2 | D70-120A | 10.0 | 24.64 | 12 | 18.06[b] |

[a]MAO charge is based on the Al wt % of the Albemarle commercial MAO toluene solution provided by the vendor. Al wt % changes from batch to batch, ranging from 13.2-13.8 wt %; typical 13.5 wt %.
[b]Wet.

For comparison to similar catalysts supported on Grace Davison Silica 948, please see FIG. 3 in concurrently filed PCT Application PCT/US2016/034784 (published as WO2017/204830, entitled "Metallocene Catalyst Compositions and Polymerization Process Therewith"), which is fully incorporated herein by reference.

Catalyst Preparation (Catalysts A-G): In a 25 mL Celstir reactor or a 20 mL vial, sMAO (amount in Table 4) and 5× toluene (e.g., 1 g sMAO, 5 g toluene) were added. The slurry was stirred at 350 rpm (Celstir) or place on a shaker (vial) to get a homogeneous mixture. TIBAL (neat) at an amount of 0.34 mmol/g sMAO was added slowly into the sMAO slurry and stirred for 15 minutes. Then, the metallocene was added and the mixture was stirred for 1 to 2 hours at RT. The slurry was filtered through a medium frit. The wet solid was washed twice with 10× sMAO (amount in Table 4) of toluene to remove excess soluble catalyst, then washed once with 10× sMAO of hexane, and then dried under vacuum for 3 hours, yielding free flow solid supported catalysts (yield in Table 4).

TABLE 4

Finished Catalyst Preparation Conditions and Polymerization Results

| Catalyst | MCN/Silica | sMAO (g) | Zr* (%) | Yield (g) |
|---|---|---|---|---|
| Catalyst A | MCN1/PD14024 | 1.0 | 0.12 | 0.98 |
| Catalyst B | MCN1/D70-120A | 15.0 | 0.12 | 14.2 |
| Catalyst C | MCN2/PD14024 | 1.0 | 0.16 | 0.99 |
| Catalyst D | MCN3/PD14024 | 1.0 | 0.16 | 0.97 |
| Catalyst E | MCN4/PD14024 | 1.0 | 0.12 | 1.0 |
| Catalyst F | MCN5/PD14024 | 1.0 | 0.16 | 1.0 |
| Catalyst G | MCN8/PD14024 | 1.0 | 0.16 | 1.0 |

*Based on charge.

Catalyst Preparation (Catalysts H and I): Catalysts H and I were prepared as described in U.S. Pat. No. 9,279,024.

Propylene Polymerization with Supported Catalysts:

Polymerization was performed in a 2-liter batch Zipper-Clave stirred reactor equipped with a water jacket for temperature control. A catalyst slurry was prepared by mixing solid catalyst with degased mineral oil as a 5 wt % slurry.

Prepolymerization: For the examples in Tables 5a, 5b, and 6, 1.0 g of slurry catalyst was charged to a catalyst tube in the dry box for the 0 psi $H_2$ runs, or 0.5 g slurry catalyst for the 20 psi $H_2$ runs and the staged $H_2$ addition run, followed by 1 ml hexane ($N_2$ spared and sieves purified). The only exception is that for the example of Tables 5a and 5b, Run 2, 1 g slurry catalyst was used for both the 0 psi $H_2$ run and the 20 psi $H_2$ run. Then, 1.75 ml TIBAL was charged to a 3 mL syringe (7.6 mL neat tri-isobutylaluminum+hexane to 100 mL, 7.6 vol %). The catalyst tube and the 3 ml syringe containing TIBAL were removed from the dry box and attached to the reactor while the reactor was being purged with nitrogen. The TIBAL solution in the syringe was injected into the reactor via a scavenger port capped with a rubber septum. The scavenger port valve was then switched off.

Propylene (1000 ml) was then introduced to the reactor through a purified propylene line. The agitator was brought to 500 rpm. The mixture was allowed to mix for 5 minutes at RT. The catalyst slurry in the catalyst tube was then flushed into the reactor with 250 ml propylene. The polymerization reaction was allowed to run for 5 minutes at RT.

For the polymerizations in Table 5a under the 0 psi $H_2$ conditions, the temperature was increased to 70° C. and held for 40 minutes. For the polymerizations in Table 5b under the 20 psi $H_2$ conditions, after increasing the temperature to 70° C., a 150 mL bomb with 20 psi $H_2$ was opened to the reactor and the reaction was allowed to run for 40 minutes at 70° C. after the $H_2$ charge. For the staged $H_2$ addition polymerization in Table 6, under the 0 psi $H_2$ condition, the temperature was increased to 70° C. and held for 40 minutes. After this, a 150 mL bomb with 55 psi $H_2$ was opened to the reactor and the reaction was allowed to run for another 10 minutes.

After the process described above, the reactor was quickly vented to stop the polymerization using the reactor vent block valve. The bottom of the reactor was dropped and a polymer sample was collected. Reaction conditions, catalyst activities, and polymer MFR data are summarized in Tables 5a, 5b, and 6 below.

TABLE 5a

Propylene Polymerizations at 70° C., No $H_2$ for 40 Min

| Run | Catalyst | Conditions | Yield (g) | Activity (g polymer/ g cat hr) | MFR | Tm (° C.) | Mw (kg/mol) | Mw/Mn |
|---|---|---|---|---|---|---|---|---|
| 1 | Catalyst D (Comparative) | No $H_2$ for 40 min | 39.75 | 1200 | 0.41 | 154.4 | | |
| 2 | Catalyst E (Comparative) | No $H_2$ for 40 min | 31.75 | 950 | 0.015 | 151.7 | | |
| 3 | Catalyst F (Comparative) | No $H_2$ for 40 min | 92.44 | 2800 | 8.9 | 154.3 | 289 | 2.0 |
| 4 | Catalyst A | No $H_2$ for 40 min | 127.42 | 3800 | 0.11 | 152.3 | 636 | 2.5 |
| 5 | Catalyst C | No $H_2$ for 40 min | 133.62 | 4000 | 0.037 | | 1475 | 2.0 |
| 6 | Catalyst B | No $H_2$ for 40 min | 104.72 | 3100 | 0.33 | 152.3 | 730 | 3.2 |
| 7 | Catalyst G | No $H_2$ for 40 min | 143.05 | 4300 | 0.16 | 152.6 | 1094 | 2.3 |

TABLE 5b

Propylene Polymerizations at 70° C., 20 psi $H_2$ for 40 Min

| Run | Catalyst | Conditions | Yield (g) | Activity (g polymer/ g cat hr) | MFR | Tm (° C.) | Mw (kg/mol) | Mw/Mn |
|---|---|---|---|---|---|---|---|---|
| 1 | Catalyst D (Comparative) | 20 psi $H_2$ for 40 min | 191.85 | 12000 | 267 | 155.9 | 115 | 2.9 |
| 2 | Catalyst E (Comparative) | 20 psi $H_2$ for 40 min | 90.96 | 2700 | 47 | 153.2 | 209 | 5.0 |
| 3 | Catalyst F (Comparative) | 20 psi $H_2$ for 40 min | 192.53 | 12000 | 810 | 155.8 | 105 | 2.7 |
| 4 | Catalyst A | 20 psi $H_2$ for 40 min | 177.76 | 11000 | 150 | 151.4 | 128 | 2.6 |
| 5 | Catalyst C | 20 psi $H_2$ for 40 min | 191.1 | 11000 | 30 | | 249 | 2.5 |
| 6 | Catalyst B | 20 psi $H_2$ for 40 min | 313.43 | 19000 | 840 | 153.7 | 150 | 2.4 |
| 7 | Catalyst G | 20 psi $H_2$ for 40 min | 250.34 | 15000 | 199 | 154.1 | 113 | 2.5 |

As seen from Run 1 in Tables 5a and 5b, comparative Catalyst D (MCN3 supported on PD14024) produces a low Mw iPP (high MFR) polymer at high catalyst activities in the presence of $H_2$. However, in the absence of $H_2$ it has low activity and gives iPP with moderately high Mw. Run 2 in Tables 5a and 5b shows that comparative Catalyst E (MCN4 on the same silica support) gives very high Mw iPP (as suggested by the MFR of 0.015), but with very low activities. Run 3 shows that comparative Catalyst F (MCN5 on the same silica) has quite high activity in the absence of $H_2$ and the iPP obtained has relatively low Mw. Under the same supportation conditions, Runs 4 and 5 show that inventive Catalyst A (MCN1 supported on PD14024) and inventive Catalyst C (MCN2 supported on PD14024) show a combination of high Mw capability (low MFR) and high activity in the absence of $H_2$. Run 6 shows that inventive Catalyst B (MCN1 supported on D70-120A) also has excellent catalyst activity and high Mw capability. Run 7 shows that inventive Catalyst G (MCN8 supported on PD14024) also has excellent catalyst activity and high Mw capability (low MFR).

To further illustrate the importance of these findings, Catalyst A was used for a staged $H_2$ addition polymerization run to produce bimodal iPP. As seen from Table 6, Run 8 below, this catalyst demonstrated high overall activities and capabilities for very broad MWD. Runs 9 and 10 summarized in Table 6 below are comparative and from U.S. Pat. No. 9,279,024 (Table 1, Examples 16 and 24 respectively), and use catalyst systems similar or identical to comparative Catalysts H and I described herein. Comparing Run 8 with Runs 9 and 10 shows that the bimodal iPP obtained from inventive Catalyst A has superior stiffness properties (1% Sec Flex Modulus of 2020 MPa) over the bimodal iPPs made with Catalysts H and I at similar MFRs.

TABLE 6

Bimodal iPP Polymerization at 70° C. with Staged $H_2$ Addition

| Run | Catalyst | Conditions | Activity (g polymer/ g cat hr) | MFR | Mw (k) | MWD | 1% Sec Flex (MPa) |
|---|---|---|---|---|---|---|---|
| 8 | Catalyst A | No $H_2$ for 40 min, 55 psi $H_2$ for 10 min | 5500 | 79 | 284 | 18.4 | 2020 |
| 9 | Catalyst H (Comparative) | U.S. Pat. No. 9,279,024; Table 1 Example 16 | 2040 | 53 | 194 | 7.6 | 1740 |
| 10 | Catalyst I (Comparative) | U.S. Pat. No. 9,279,024; Table 1 Example 24 | 1820 | 46 | 332 | 14.8 | 1686 |

Figure 4:
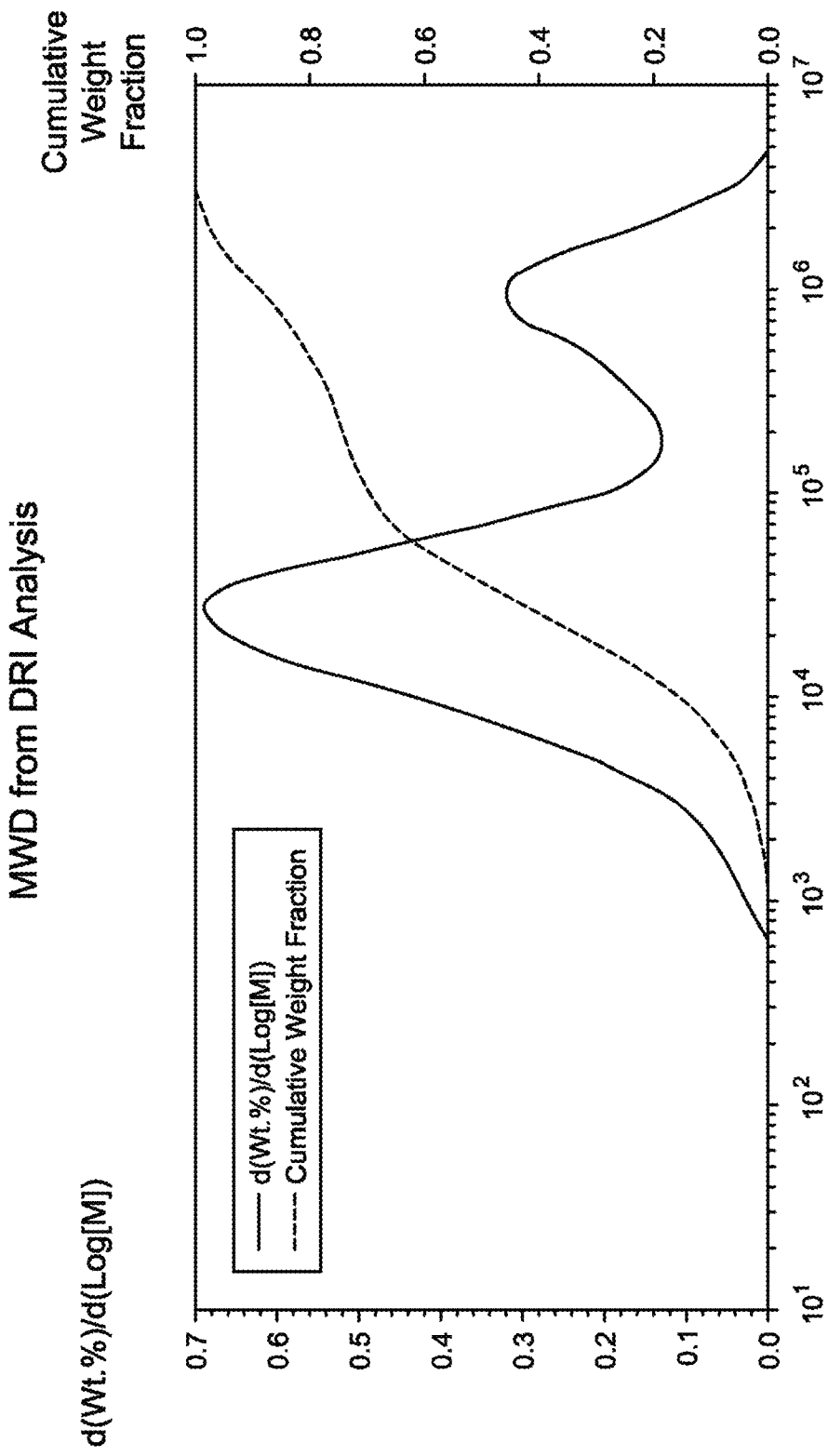
FIG. 4 is a graph of molecular weight distribution for a bimodal iPP (Run 8 in Table 6) made using a catalyst system according to the invention.

FIG. 4 is a graph of the polymer MWD from DRI Analysis for the bimodal polypropylene produced according to the example in Table 6, Run 8.

All documents described herein are incorporated by reference herein for purposes of all jurisdictions where such practice is allowed, including any priority documents, related application and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of", "consisting of", "selected from the group of consisting of", or "is" preceding the recitation of the composition, element, or elements and vice versa.

What is claimed is:

1. An olefin polymerization catalyst system comprising:

i) a metallocene catalyst compound represented by the formula:

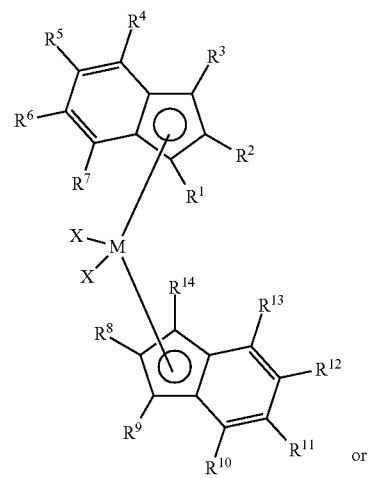

or

-continued

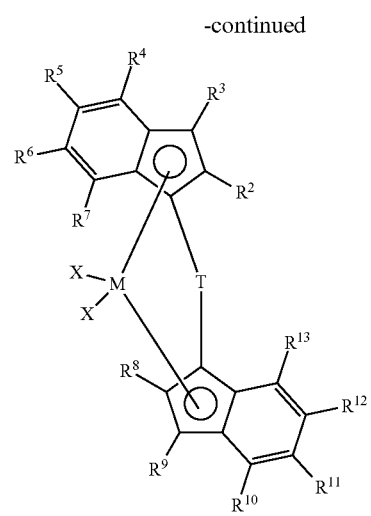

wherein $R^2$ and $R^8$ are different and, independently, a $C_1$ to $C_{20}$ linear alkyl group, provided that at least one of $R^2$ and $R^8$ has at least 4 carbon atoms;

$R^4$ and $R^{10}$ are substituted or unsubstituted aryl groups;

M is a transition metal selected from Group 2, 3, or 4 of the Periodic Table;

T is a bridging group;

each X is an anionic leaving group;

each $R^1$, $R^3$, $R^5$, $R^6$, $R^7$, $R^9$, $R^{11}$, $R^{12}$, $R^{13}$, and $R^{14}$ is, independently, hydrogen, a hydrocarbyl, substituted hydrocarbyl, halocarbyl, substituted halocarbyl, silylcarbyl, substituted silylcarbyl, germylcarbyl, or substituted germylcarbyl substituents;

wherein either or both of $R^5$ and $R^6$ or $R^{11}$ and $R^{12}$ optionally join together to form a ring structure; and ii) a support having an average surface area of from about 400 m²/g to 800 m²/g, an average pore diameter of from 60 Angstroms to 200 Angstroms; and at least 20% of the incremental pore volume comprises pores having a pore diameter larger than 100 Angstroms; and iii) an aluminoxane having an aluminoxane loading of greater than about 7 mmol Al/g support.

2. The catalyst system of claim 1, wherein the support has:
an average pore diameter of from 60 Angstroms to 180 Angstroms;
at least 20% of the incremental pore volume comprises pores having a pore diameter larger than 215 Angstroms; and
an aluminoxane loading of greater than about 9.0 mmol Al/g support.

3. The catalyst system of claim 1, wherein the support has:
an average surface area of from about 550 m²/g to 650 m²/g support;
an average pore diameter of from about 80 Angstroms to 130 Angstroms;
an average pore volume of from about 0.5 ml/g to 2.5 ml/g support; and
an average particle size of from about 20 micrometers to 200 micrometers.

4. The catalyst system of claim 1, wherein the support comprises agglomerates of a plurality of primary particles.

5. The catalyst system of claim 1, wherein $R^2$ is methyl, ethyl, n-propyl, n-butyl, n-pentyl, n-hexyl, n-heptyl, n-octyl, n-nonyl or n-decyl.

6. The catalyst system of claim 1, wherein $R^8$ is methyl, ethyl, n-propyl, n-butyl, n-pentyl, n-hexyl, n-heptyl, n-octyl, n-nonyl or n-decyl.

7. The catalyst system of claim 1, wherein at least one of $R^4$ and $R^{10}$ is a phenyl group substituted at the 3' and 5' positions with $C_1$ to $C_{10}$ alkyl groups, aryl groups, or combinations thereof.

8. The catalyst system of claim 1, wherein $R^4$ and $R^{10}$ are independently a phenyl group substituted at the 3' and 5' positions with $C_1$ to $C_{10}$ alkyl groups, aryl groups, or combinations thereof and, optionally, the 4' position is substituted with a group selected from (XR'n)⁻, wherein X is a heteroatom selected from Groups 14 to 17 of the Periodic Table having an atomic weight of 13 to 79, and R' is one of a hydrogen atom, a halogen atom, a $C_1$ to $C_{10}$ alkyl group or a $C_6$ to $C_{10}$ aryl group, and n is 0, 1, 2, or 3.

9. The catalyst system of claim 1, wherein at least one of $R^4$ and $R^{10}$ is a phenyl group substituted at the 2' position with an alkyl or aryl group.

10. The catalyst system of claim 1, wherein one of $R^5$ and $R^6$ or $R^{11}$ and $R^{12}$ join together to form a ring structure.

11. The catalyst system of claim 1, wherein each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof and two X optionally form a part of a fused ring or a ring system.

12. The catalyst system of claim 1, wherein T is represented by the formula $R^a{}_2J$, where J is C, Si, or Ge, each $R^a$ is, independently, a hydrogen atom, a halogen atom, a $C_1$ to $C_{20}$ hydrocarbyl or a $C_1$ to $C_{20}$ substituted hydrocarbyl, and two $R^a$ optionally form a cyclic structure including an aromatic, a partially saturated, or a saturated cyclic or fused ring system.

13. The catalyst system of claim 1, wherein T is $CH_2$, $CH_2CH_2$, $C(CH_3)_2$, $SiMe_2$, $SiPh_2$, $SiMePh$, $Si(CH_2)_3$, $Si(CH_2)_4$, $Si(Me_3SiPh)_2$, or $Si(CH_2)_5$.

14. An olefin polymerization catalyst system comprising:
i) a metallocene catalyst compound is represented by one or more of the following compounds:

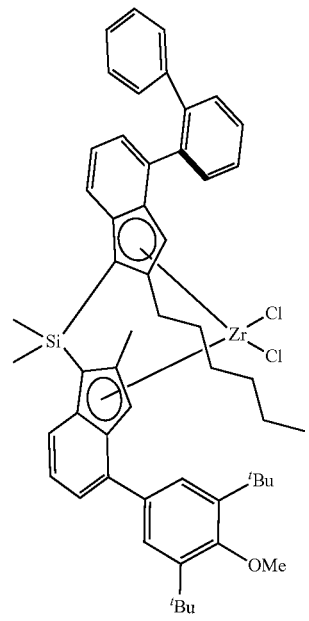

MCN1

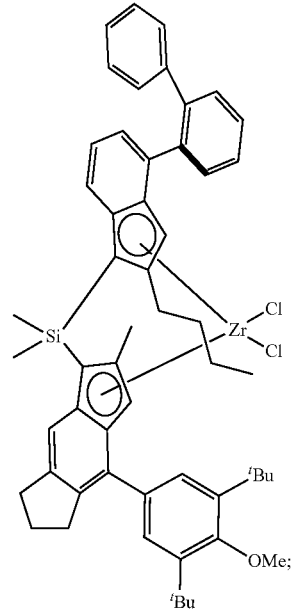

MCN8 and
  ii) a support having an average surface area of from about 400 m²/g to 800 m²/g support; and
  iii) an aluminoxane.

15. The catalyst system of claim 1, wherein the aluminoxane is present at a molar ratio of aluminum to metallocene catalyst compound transition metal of 100:1 or more.

16. The catalyst system of claim 1, wherein a rac-isomer to meso-isomer ratio is 10:1 or greater.

17. The catalyst system of claim 1, further comprising an aluminum alkyl.

18. A process to polymerize olefins comprising contacting one or more olefins with the catalyst system of claim 1 in a reactor and recovering a polymer.

19. The process of claim 18, wherein molecular hydrogen is not added to the reactor.

20. A process to produce isotactic polypropylene, the process comprising contacting the catalyst system of claim 1, with propylene and obtaining isotactic polypropylene.

21. The process of claim 20, further comprising contacting the catalyst system with propylene at a first hydrogen concentration in the reactor, adjusting to a second hydrogen concentration, and recovering isotactic polypropylene having a bimodal molecular weight distribution.

22. The process of claim 21, further comprising contacting the isotactic polypropylene with ethylene and optional comonomer to produce an impact copolymer.

23. The process of claim 21, wherein the isotactic polypropylene has a melt flow rate (MFR, ASTM D-1238, 2.16 kg and 230° C.) of less than about 0.3 dg/min.

24. The process of claim 20, wherein the catalyst system has a catalyst activity of at least 3000 g polymer/g catalyst hr and the weight average molecular weight of the isotactic polypropylene is at least 600 kg/mol.

25. The process of claim 20, wherein the catalyst system has a catalyst activity of at least 4000 g polymer/g catalyst hr and the weight average molecular weight of the isotactic polypropylene is at least 1400 kg/mol.

26. The process of claim 20, wherein the isotactic polypropylene has a melting temperature, Tm, DSC peak second melt, of at least 151° C.

27. The catalyst system of claim 1, wherein:
  a) the support has:
    i) an average pore diameter of from 60 Angstroms to 300 Angstroms;
    ii) at least 20% of the incremental pore volume comprises pores having a pore diameter larger than 100 Angstroms; and
    iii) an aluminoxane loading of greater than about 7 mmol Al/g support;
  b) the support comprises agglomerates of a plurality of primary particles;
  c) $R^2$ is methyl, ethyl, n-propyl, n-butyl, n-pentyl, n-hexyl, n-heptyl, n-octyl, n-nonyl or n-decyl;
  d) $R^8$ is methyl, ethyl, n-propyl, n-butyl, n-pentyl, n-hexyl, n-heptyl, n-octyl, n-nonyl or n-decyl; and
  e) at least one of $R^4$ and $R^{10}$ is a phenyl group substituted at the 3' and 5' positions with $C_1$ to $C_{10}$ alkyl groups, aryl groups, or combinations thereof.

28. The catalyst system of claim 1, wherein:
  a) the support has:
    i) an average surface area of from about 550 m²/g to 650 m²/g support;
    ii) an average pore diameter of from about 80 Angstroms to 130 Angstroms;
    iii) an average pore volume of from about 0.5 ml/g to 2.5 ml/g support;
    iv) an average particle size of from about 20 micrometers to 200 micrometers;
  b) the support comprises agglomerates of a plurality of primary particles;
  c) $R^2$ is methyl, ethyl, n-propyl, n-butyl, n-pentyl, n-hexyl, n-heptyl, n-octyl, n-nonyl or n-decyl;
  d) $R^8$ is methyl, ethyl, n-propyl, n-butyl, n-pentyl, n-hexyl, n-heptyl, n-octyl, n-nonyl or n-decyl; and
  e) $R^4$ and $R^{10}$ are independently a phenyl group substituted at the 3' and 5' positions with $C_1$ to $C_{10}$ alkyl groups, aryl groups, or combinations thereof and, optionally, the 4' position is substituted with a group selected from $(XR'n)^-$, wherein X is a heteroatom selected from Groups 14 to 17 of the Periodic Table having an atomic weight of 13 to 79, and R' is one of a hydrogen atom, a halogen atom, a $C_1$ to $C_{10}$ alkyl group or a $C_6$ to $C_{10}$ aryl group, and n is 0, 1, 2, or 3.

29. The catalyst system of claim 27, wherein each X is, independently, selected from the group consisting of: hydrocarbyl radicals having from 1 to 20 carbon atoms, hydrides, amides, alkoxides, sulfides, phosphides, halides, dienes, amines, phosphines, ethers, and a combination thereof; and two X optionally form a part of a fused ring or a ring system; and T is represented by the formula $R^a{}_2J$, where J is C, Si, or Ge, each $R^a$ is, independently, a hydrogen atom, a halogen atom, a $C_1$ to $C_{20}$ hydrocarbyl or a $C_1$ to $C_{20}$ substituted hydrocarbyl, and two $R^a$ optionally form a cyclic structure including an aromatic, a partially saturated, or a saturated cyclic or fused ring system.

30. A process to polymerize olefins comprising contacting one or more olefins with the catalyst system of claim 27 in a reactor and recovering a polymer.

31. A process to produce isotactic polypropylene, the process comprising contacting the catalyst system of claim 28 with propylene and obtaining isotactic polypropylene.

32. A process to produce isotactic polypropylene, the process comprising contacting the catalyst system of claim 29 with propylene and obtaining isotactic polypropylene.

33. The catalyst system of claim 1, wherein $R^2$ is methyl, ethyl, n-propyl, n-butyl, and $R^8$ is n-butyl, n-pentyl, n-hexyl, n-heptyl, n-octyl, n-nonyl or n-decyl.

34. The catalyst system of claim 1, wherein $R^2$ is methyl, ethyl, n-propyl, and $R^8$ is n-butyl, n-pentyl, n-hexyl, n-heptyl, n-octyl, n-nonyl or n-decyl.

35. The catalyst system of claim 1, wherein the support has an aluminoxane loading of greater than about 10 mmol Al/g support.

36. The catalyst system of claim 1, wherein the support has an aluminoxane loading of 10 mmol Al/g support to 20 mmol Al/g support.

37. The catalyst system of claim 1, wherein the support has an aluminoxane loading of 10 mmol Al/g support to 20 mmol Al/g support.

38. An olefin polymerization catalyst system comprising:
  i) a metallocene catalyst compound represented by the formula:

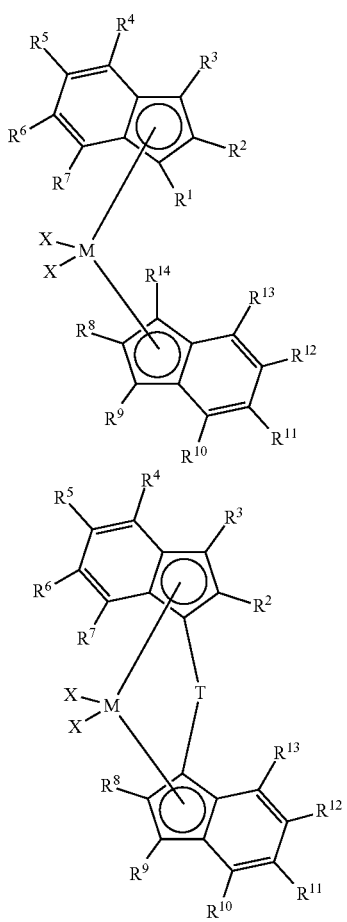

wherein $R^2$ and $R^8$ are, independently, a $C_1$ to $C_{20}$ linear alkyl group, provided that at least one of $R^2$ and $R^8$ has at least 4 carbon atoms;

$R^4$ and $R^{10}$ are substituted or unsubstituted aryl groups;

M is a transition metal selected from Group 2, 3, or 4 of the Periodic Table;

T is a bridging group;

each X is an anionic leaving group;

each R1, R3, R5, R6, R7, R9, R11, R12, R13, and $R^{14}$ is, independently, hydrogen, a hydrocarbyl, substituted hydrocarbyl, halocarbyl, substituted halocarbyl, silylcarbyl, substituted silylcarbyl, germylcarbyl, or substituted germylcarbyl substituents;

wherein either or both of $R^5$ and $R^6$ and $R^{11}$ and $R^{12}$ optionally join together to form a ring structure; and ii) a support having an average surface area of from about 400 to 800 m²/g support, an average pore diameter of from 60 to 200 Angstrom; and at least 20% of an incremental pore volume comprising pores having a pore diameter larger than 100 Angstrom;

and iii) an aluminoxane having an aluminoxane loading of greater than about 7 mmol Al/g support;

wherein the catalyst system has an activity of at least 3,000 g polymer/g catalyst·hr when polymerizing propylene at 70° C. without adding $H_2$.

39. An olefin polymerization catalyst system comprising:
i) a metallocene catalyst compound represented by the formula:

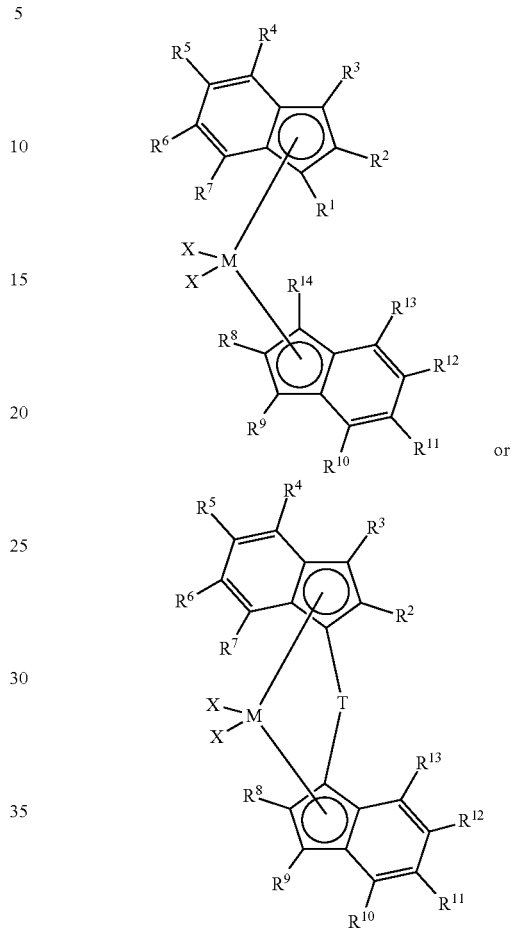

wherein $R^2$ and $R^8$ are both a C4 linear alkyl group;

$R^4$ and $R^{10}$ are substituted or unsubstituted aryl groups;

M is a transition metal selected from Group 2, 3, or 4 of the Periodic Table;

T is a bridging group;

each X is an anionic leaving group;

each R1, R3, R5, R6, R7, R9, R11, R12, R13, and $R^{14}$ is, independently, hydrogen, a hydrocarbyl, substituted hydrocarbyl, halocarbyl, substituted halocarbyl, silylcarbyl, substituted silylcarbyl, germylcarbyl, or substituted germylcarbyl substituents;

wherein either or both of $R^5$ and $R^6$ and $R^{11}$ and $R^{12}$ optionally join together to form a ring structure; and ii) a support having an average surface area of from about 400 to 800 m²/g, an average pore diameter of from 60 to 200 Angstrom; and at least 20% of an incremental pore volume comprising pores having a pore diameter larger than 100 Angstrom;

and iii) an aluminoxane having an aluminoxane loading of greater than about 7 mmol Al/g support.

40. The catalyst system of claim 14, wherein the support has an aluminoxane loading of greater than about 7 mmol Al/g support.

* * * * *